(12) United States Patent
Park et al.

(10) Patent No.: US 10,939,027 B2
(45) Date of Patent: *Mar. 2, 2021

(54) VOICE COIL MOTOR COMPRISING A STRUCTURE FORMING A SPACE FOR MOVEMENT OF AN ELASTIC MEMBER

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,776

(22) Filed: Aug. 13, 2019

(65) Prior Publication Data

US 2020/0021726 A1     Jan. 16, 2020

Related U.S. Application Data

(63) Continuation of application No. 16/025,194, filed on Jul. 2, 2018, now Pat. No. 10,419,654, which is a
(Continued)

(30) Foreign Application Priority Data

Jan. 3, 2014 (KR) ........................ 10-2014-0000567
Jan. 7, 2014 (KR) ........................ 10-2014-0001785
(Continued)

(51) Int. Cl.
*H04N 5/225*       (2006.01)
*H02K 41/035*     (2006.01)

(52) U.S. Cl.
CPC ....... *H04N 5/2257* (2013.01); *H02K 41/0354* (2013.01); *H04N 5/2252* (2013.01); *H04N 5/2253* (2013.01); *H04N 5/2254* (2013.01)

(58) Field of Classification Search
CPC .. H04N 5/2257; H04N 5/2252; H04N 5/2253; H04N 5/2254; H04N 5/23212; H02K 41/0354

See application file for complete search history.

(56) References Cited

U.S. PATENT DOCUMENTS 8,498,069 B2    7/2013   Ku
9,591,191 B2    3/2017   Park
(Continued)

FOREIGN PATENT DOCUMENTS

CN         101726851         6/2010
CN         102075056         5/2011
(Continued)

OTHER PUBLICATIONS

U.S. Office Action dated Dec. 30, 2015 issued in grandparent U.S. Appl. No. 14/588,479.
(Continued)

*Primary Examiner* — Gevell V Selby
(74) *Attorney, Agent, or Firm* — KED & Associates LLP

(57) ABSTRACT

A camera module according to an exemplary embodiment of the present disclosure is proposed, the camera module including a PCB (Printed Circuit Board) mounted with an image sensor, a housing member arranged at an upper surface of the PCB, a bobbin movably positioned at an inner side of the housing member, an upper elastic member connected to an upper surface of the housing member and to an upper surface of the bobbin, and a space forming part formed at one side of the housing member to provide a moving space to the upper elastic member when the bobbin makes a relatively vertical movement to the housing member.

20 Claims, 24 Drawing Sheets

Related U.S. Application Data continuation of application No. 15/412,614, filed on Jan. 23, 2017, now Pat. No. 10,038,832, which is a continuation of application No. 14/588,479, filed on Jan. 2, 2015, now Pat. No. 9,591,191.

(30) Foreign Application Priority Data

| Jan. 7, 2014 | (KR) | .......................... 10-2014-0001789 |
| Jan. 7, 2014 | (KR) | .......................... 10-2014-0001796 |
| Jan. 7, 2014 | (KR) | .......................... 10-2014-0001802 |

(56) References Cited

U.S. PATENT DOCUMENTS

| 10,048,569 | B2 | 8/2018 | Lee et al. | |
| 10,419,654 | B2* | 9/2019 | Park | ................... H04N 5/2253 |
| 2011/0121666 | A1 | 5/2011 | Park et al. | |
| 2011/0217034 | A1 | 9/2011 | You | |
| 2012/0025633 | A1 | 2/2012 | Lee | |
| 2013/0119785 | A1* | 5/2013 | Han | ................... G02B 7/102 |
| | | | | 310/12.16 |
| 2014/0072289 | A1 | 3/2014 | Lim | |
| 2014/0327790 | A1 | 11/2014 | Kim | |
| 2014/0355120 | A1 | 12/2014 | Yeo | |
| 2014/0375875 | A1* | 12/2014 | Yeo | ................... H04N 5/2257 |
| | | | | 348/373 |

FOREIGN PATENT DOCUMENTS

| CN | 102830570 | 12/2012 |
| JP | 2010-096862 | 4/2010 |
| KR | 10-0771205 | 10/2007 |
| KR | 2010-0058859 | 6/2010 |
| KR | 2010-0093778 | 8/2010 |
| KR | 10-0987934 | 10/2010 |
| KR | 2010-0106011 | 10/2010 |
| KR | 2011-0039634 | 4/2011 |
| KR | 2011-0055969 | 5/2011 |
| KR | 2012-0053840 | 5/2012 |
| KR | 2012-0095010 | 8/2012 |
| KR | 2013-0042758 | 4/2013 |
| KR | 10-2013-0060534 A | 6/2013 |
| KR | 10-1343197 | 12/2013 |
| TW | 201136074 | 10/2011 |

OTHER PUBLICATIONS

U.S. Office Action dated May 25, 2016 issued in grandparent U.S. Appl. No. 14/588,479.

U.S. Office Action dated Nov. 16, 2017 issued in parent U.S. Appl. No. 15/412,614.

Chinese Office Action dated Jun. 19, 2018 issued in CN Application No. 201410843890.2.

* cited by examiner

VOICE COIL MOTOR COMPRISING A STRUCTURE FORMING A SPACE FOR MOVEMENT OF AN ELASTIC MEMBER

CROSS-REFERENCE TO RELATED APPLICATIONS

This application is a Continuation Application of Ser. No. 16/025,194, filed Jul. 2, 2018, which is a Continuation Application of U.S. patent application Ser. No. 15/412,614, filed Jan. 23, 2017 (now U.S. Pat. No. 10,038,832), which is a Continuation Application of U.S. patent application Ser. No. 14/588,479, filed Jan. 2, 2015 (now U.S. Pat. No. 9,591,191), which claims priority under 35 U.S.C. § 119 to Korean Application No. 10-2014-0000567, filed on Jan. 3, 2014, Korean Application No. 10-2014-0001796, filed on Jan. 7, 2014, Korean Application No. 10-2014-0001802, filed on Jan. 7, 2014, Korean Application No. 10-2014-0001785, filed on Jan. 7, 2014, and Korean Application No. 10-2014-0001789, filed on Jan. 7, 2014, whose entire disclosures are hereby incorporated by reference.

BACKGROUND

1. Field

The teachings in accordance with the exemplary embodiments of this present disclosure generally relate to a camera module.

2. Background

Generally, a camera module may include an optical system formed with an image sensor, a PCB (Printed Circuit Board) mounted with the image sensor configured to transmit an electric signal, an IR (Infrared) cut-off filter configured to cut off light of infrared region and at least one sheet of lens configured to transmit an image to the image sensor. At this time, the optical system may be installed with an actuator module configured to perform an auto focusing function and a hand shake correction function.

The actuator module may be variably configured and generally uses a VCM (Voice Coil Motor). The VCM may perform an auto focusing function by being operated by an electrical interaction between a magnet fixed to a holder member and a coil unit wound on a periphery of a bobbin reciprocally installed at a lens barrel side. The actuator module of VCM method may be configured such that a vertically-moving bobbin is reciprocally moved to a direction parallel to an optical axis by being elastically supported by bottom and upper elastic members.

The auto focusing function of the conventional VCM is performed by a bobbin including a plural sheet of lenses being driven to one direction. That is, when electricity is applied, the bobbin is moved upwards from an initial position to perform a focusing operation, and the electricity is cut off during movement to an opposite direction to allow the bobbin to return to an original position by self-weight of the bobbin and elastic restoring force of the elastic members. However, in case of a bi-directional driving actuator capable of performing more accurate focusing control, a position of the bobbin suspended in a space is made an initial position, and when a conventional camera module structure is used as it is, there is required a structural change capable of solving an interference of adjacent elements due to strokes of bobbin being relatively great.

BRIEF DESCRIPTION OF THE DRAWINGS

The embodiments will be described in detail with reference to the following drawings in which like reference numerals refer to like elements wherein.

DETAILED DESCRIPTION

Various exemplary embodiments will be described more fully hereinafter with reference to the accompanying drawings, in which some exemplary embodiments are shown.

The terminology used herein is for the purpose of describing particular embodiments only and is not intended to be limiting of the disclosure. Accordingly, in some embodiments, well-known processes, well-known device structures and well-known techniques are not illustrated in detail to avoid unclear interpretation of the present disclosure. The same reference numbers will be used throughout the specification to refer to the same or like parts.

It will be understood that, although the terms first, second, A, B, (a), (b), etc. may be used herein to describe various elements, these elements should not be limited by these terms in terms of substances, sequences or orders. These terms are only used to distinguish one element from another. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Hereinafter, a camera module according to a first exemplary embodiment of the present disclosure will be described in detail with reference to the accompanying drawings.

Figure 1:
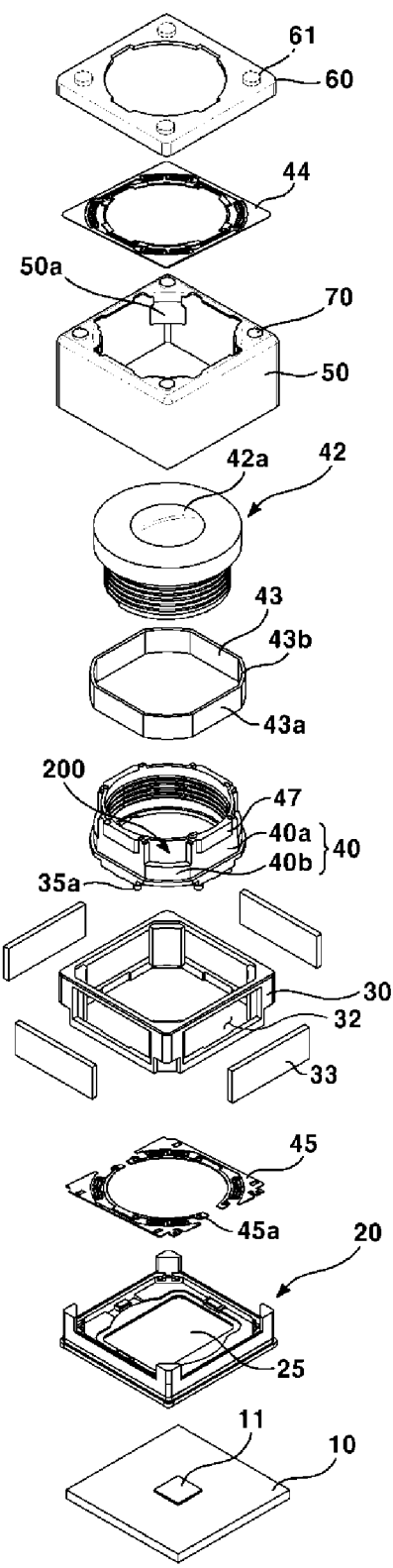
FIG. 1 is an exploded perspective view illustrating a camera module according to a first exemplary embodiment of the present disclosure.
Figure 2:
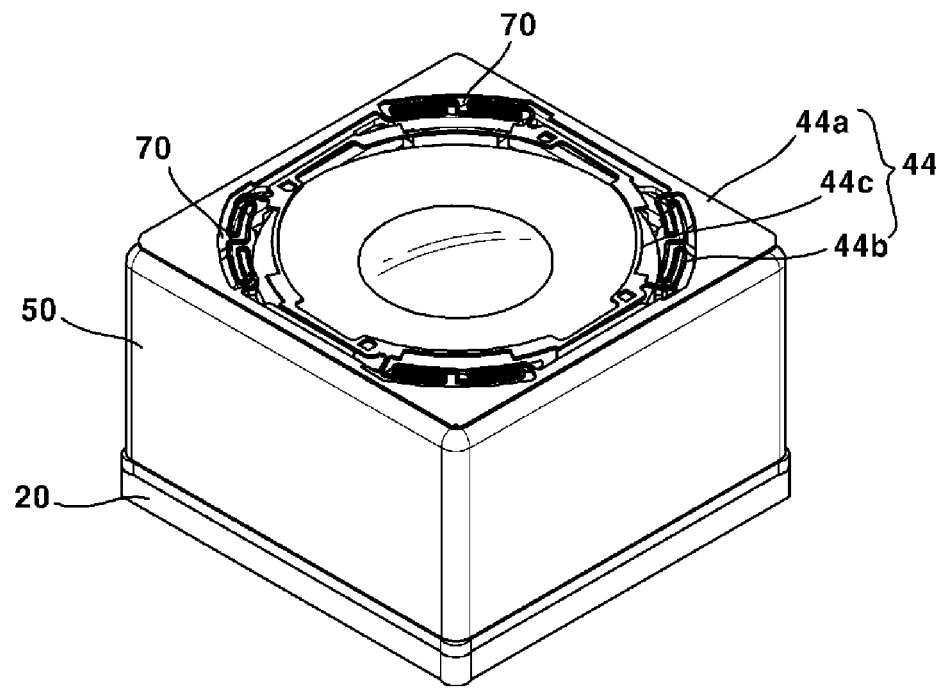
FIG. 2 is a perspective view illustrating a part of a camera module according to a first exemplary embodiment of the present disclosure.
Figure 3:
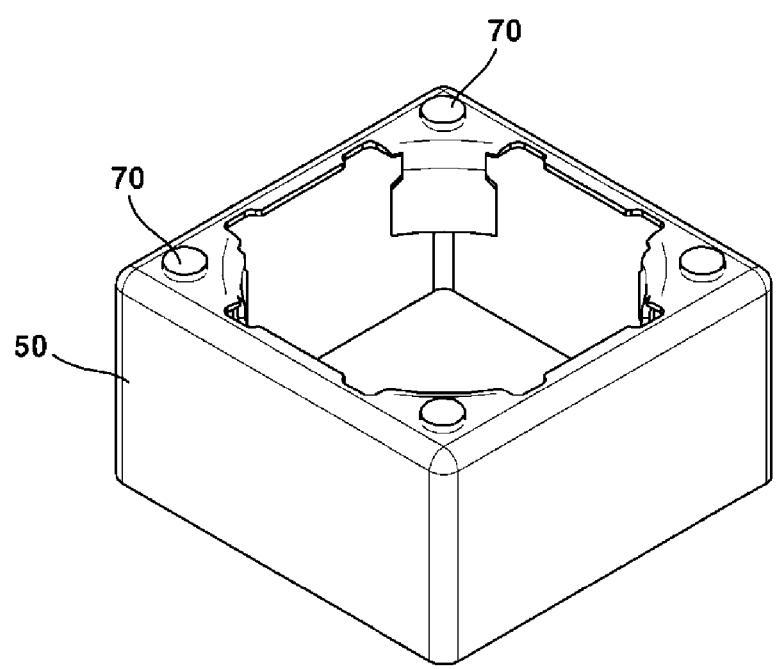
FIG. 3 is a perspective view illustrating a housing member of a camera module according to a first exemplary embodiment of the present disclosure.
Figure 4:
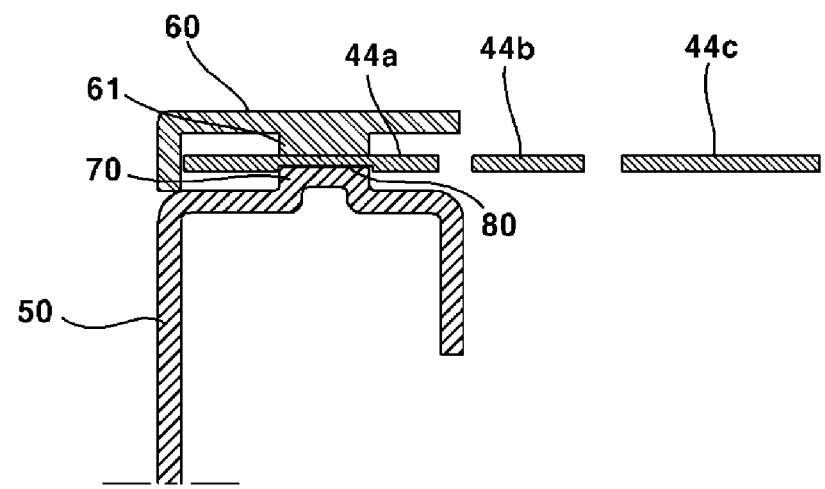
FIGS. 4, 5 and 6 are schematic views illustrating movement of upper elastic member mounted at an upper side of the housing member according to a first exemplary embodiment of the present disclosure.
Figure 5:
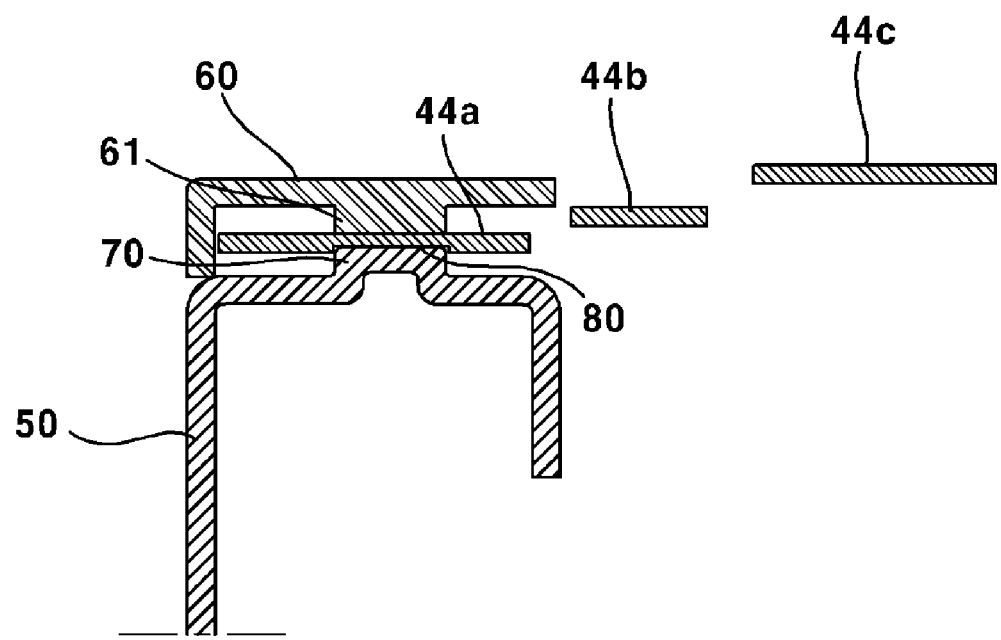
Figure 6:
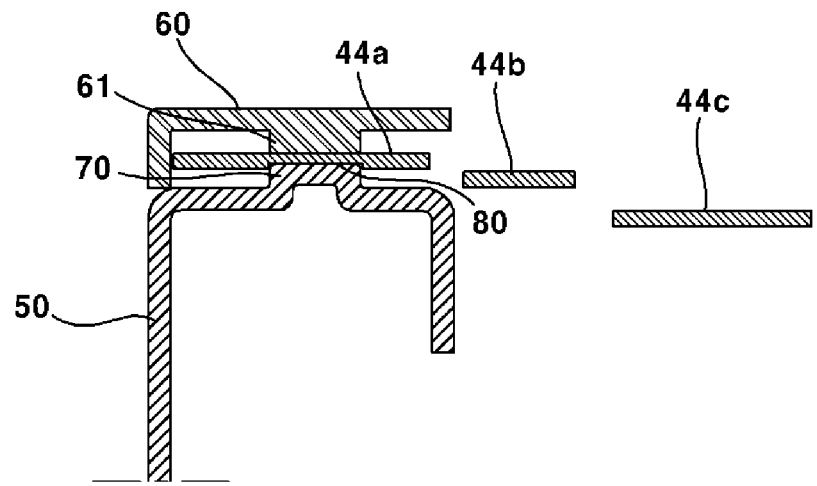

FIG. 1 is an exploded perspective view illustrating a camera module according to a first exemplary embodiment of the present disclosure, FIG. 2 is a perspective view illustrating a part of a camera module according to a first exemplary embodiment of the present disclosure, FIG. 3 is a perspective view illustrating a housing member of a camera module according to a first exemplary embodiment of the present disclosure, FIGS. 4, 5 and 6 are schematic views illustrating movement of upper elastic member mounted at an upper side of the housing member according to a first exemplary embodiment of the present disclosure, and FIGS. 7 to 11 are exemplary views illustrating various modified examples of a camera module according to a first exemplary embodiment of the present disclosure.

Referring to FIG. 1, a camera module according to a first exemplary embodiment of the present disclosure may include a PCB (10), a base (20), a bobbin (40), a housing member (50) and a cover member (60). Although the camera module may include a holder member (30) as illustrated in FIG. 1, the holder member may be omitted, if necessary.

Meantime, the camera module according to the first exemplary embodiment of the present disclosure may further include a space forming part configured to provide a moving space to an upper elastic member (44) when the bobbin (40) vertically moves relative to the housing member (50). Although the space forming part may be a support protrusion (70, described later), the present disclosure is not limited thereto.

The PCB (10) is mounted with an image sensor (11), and may form a floor surface of the camera module. The base (20) may be mounted at a position corresponding to the image sensor (11) with an IR (infrared) cut-off filter (25) and may support a bottom side of the housing member (50). The base (20) may be separately mounted with a terminal member for electric conductivity with the PCB (10), and may be integrally formed with a terminal using a surface electrode.

Meantime, the base (20) may function as a sensor holder configured to protect the image sensor (11), and in this case, a protrusion may be formed to a bottom direction along a lateral surface of the base (20). However, the protrusion is not an essential element, and albeit not being illustrated, a separate holder sensor may be arranged at a bottom surface of the base to function as the protrusion.

The holder member (30) may take an approximately square shape, and may be formed with magnet installation holes (32) mountable with a plurality of magnets (33) at four surfaces thereof. Alternatively, albeit not being illustrated, mounting holes may be formed instead of the magnet installation holes (32). At this time, each of the magnets (33) may be formed in a corresponding size, and facing magnets (33) may be arranged in parallel.

Meantime, although the magnets (33) are arranged on four lateral walls of the holder member (30) in the first exemplary embodiment, the present disclosure is not limited thereto, and the magnets (33) may be arranged on four corner areas of the holder member (30). The holder member (30) is not an essential configuration, and may be omitted. When the holder member (30) is omitted, the magnets (33) may be directly secured to the housing member (50, described later). When the magnets (33) are directly secured to the housing member (50), the magnets (33) may be directly bonded to a lateral surface or corners of the housing member (50).

Referring to FIG. 1, the holder member (30) may take a shape of a cubic with four surfaces provided with thin frame shapes, and an upper side and a bottom side of the holder member (30) may be mounted with upper and bottom elastic members (44, 45, described later) to elastically support the reciprocal movement of the bobbin (40) to an axial direction. The holder member (30) may be integrally formed as illustrated in FIG. 1. The present disclosure is not limited thereto, and the holder member (30) may be provided with an upper portion and a bottom portion being separated.

A floor surface of the holder member (30) may be coupled to the base (20), and an upper surface of the holder member (30) may be coupled to the housing member (50, described later) to be fixed in position. Absent the holder member (30), the bottom elastic member (45) may be supported by the base (20), and the upper elastic member (44) may be supported by the housing member (50).

The bobbin (40) may be reciprocally mounted at an inside space of the housing member (50) to a direction parallel to an optical axis. The bobbin (40) may be mounted at a periphery with a coil unit (43) to enable an electrical interaction with the magnets (33). The bobbin (40) may include therein a lens barrel (42) mounted with at least one lens (42a). The lens barrel (42) may be so formed as to be screwed into the bobbin (40) as illustrated in FIG. 1. However, the present disclosure is not limited thereto, and the lens barrel (42) may be directly fixed to an inside of the bobbin (40) by other methods than the screwing, or one sheet or more sheets of lenses may be integrally formed with bobbin (40) without the assistance of lens barrel (42). The lens (42a) may be formed with one sheet, or two or more lenses may form an optical system.

The bobbin (40) may be mounted at an upper surface and a bottom surface with upper elastic member (44) and a bottom elastic member (45). The upper elastic member (44) may be connected at one end to the bobbin (40) and connected at the other end to an upper side of the housing member (50, described later). The bottom elastic member (45) may be connected at one end to the bobbin (40) and connected at the other end to the base (20). To this end, the bobbin (40) may be formed at a bottom side with a protrusion (35a) for coupling with the bottom elastic member (45), and a protrusion accommodation hole (45a) may be formed at a position corresponding to that of the bottom elastic member (45), whereby the bottom elastic member (45) can be fixed.

Now, referring to FIG. 2, the upper elastic member (44) may include a first fixation part (44a) fixed to a housing member (50) side, a second fixation part (44c) connected to a bobbin (40) side, and a connection part (44b) configured to connect the first and second fixation parts (44a, 44c). At this time, the connection part (44b) may take a shape of a predetermine pattern, the movement of which enables the support of the bobbin (40).

The cover member (60) may be coupled to the housing member (50) while covering the upper elastic member (44). As illustrated in FIGS. 1, 4 and 6, an inner surface opposite to the upper elastic member (44) of the cover member (60) may be protrusively formed with a support boss (61) configured to contact an upper surface of the upper elastic member (44). At this time, an end of the support boss (61) may surface-contact the upper elastic member (44).

Meantime, the upper elastic member (44) may be spaced apart from an upper surface of the housing member (50) at a predetermined distance, which is to prevent the upper elastic member (44) from interfering with the housing member (50) during vertical movement of the bobbin (40). To this end, a support protrusion (70) may be protrusively and integrally formed at an upper side of the housing member (50).

The bobbin (40) may be elastically supported in the bi-directional movement relative to an optical axis by the upper and bottom elastic members (44, 45) thus coupled. That is, the bobbin (40) may be vertically moved about an initial position spaced apart from the base (20) at a predetermined distance.

The coil unit (43) may be provided as a ring-shaped coil block coupled to a periphery of the bobbin (40). The coil unit (43) formed in the shape of a coil block may include a straight line surface (43a) arranged at a position corresponding to that of the magnet (33) and a curved line surface (43b) arranged at a position corresponding to that of an inner yoke and an accommodation groove (described later).

Alternatively, the coil unit (43) shaped in the form of a coil block may take an angled shape, and may be of a octagonal shape, the shape of which is proposed in consideration of electromagnetic action with the oppositely-arranged magnet (33), and when a surface opposite to the magnet (33) is a plan, a surface of the facing coil unit (43) may be a plan to thereby maximize the generation of electromagnetic force. However, the present disclosure is not limited thereto, and a surface of the coil unit (43) and a surface of the magnet (33) may be all curved or plain, or one of the surface of the coil unit (43) and the surface of the magnet (33) may be curved while the remaining may be plain.

The bobbin (40) may include a first surface (40a) flatly formed on a surface corresponding to that of the straight line surface (43a) to allow the coil unit (43) to be coupled to a periphery of the bobbin (40), and a second surface (40b) formed in a round shape on a surface corresponding to that of the curved line surface (43b). Furthermore, the coil unit (43) may be directly wound on the bobbin (40), and in this case, the first surface (40a) may be formed with a protrusion part (47) configured to prevent the coil unit (43) from being deviated to an optical axis direction, whereby the coil unit (43) is prevented from being deviated from an installation position by the shock generated during the reciprocal movement of the bobbin (40), or the arranged position of the coil unit (43) may be guided.

Furthermore, the bobbin (40) may be formed at a periphery with a plurality of accommodation grooves (not shown) forming a space part by being spaced apart from the coil unit (43) at a predetermined distance, where the plurality of accommodation grooves (not shown) may be inserted by an inner yoke (50a) formed on the housing member (50). The present disclosure is not limited thereto, and a separate yoke may be provided instead of the inner yoke (50a). The housing member (50) may be a yoke housing configured to function as a yoke.

The housing member (50) may be formed with a ferromagnetic body such as steel. Furthermore, the housing member (50) may be provided with an angled shape when viewed from an upper side in order to wrap the bobbin (40). At this time, the housing member (50) may take a square shape as illustrated in FIGS. 1 to 3, or an octagonal shape, albeit not being illustrated.

The housing member (50) may be integrally formed with the inner yoke (50a) at a position corresponding to that of the accommodation groove, and one surface of the inner yoke (50a) is spaced apart from the coil unit (43) at a predetermined distance, and the other surface of the inner yoke (50a) may be spaced apart from the bobbin (40) at a predetermined distance.

Furthermore, the inner yoke (50a) and the accommodation groove (not shown) may be formed at four corner areas of the housing member (50). The inner yoke (50a) may be bent to a direction parallel with an optical axis from an upper surface of the housing member (50) to an inner side. The inner yoke (50a) may be symmetrically formed with a pair of escape grooves at a position near to a bent portion. The bent portion formed with the escape grooves may form a bottleneck section, and interference of the inner yoke (50a) and the bobbin (40) may be minimized during movement of the bobbin (40) by a section where the escape grooves are formed.

A distal end of the inner yoke (50a) needs to be spaced apart at a reference position at a predetermined distance from a floor surface of the accommodation groove, which is to prevent interference and contact between and with a distal end of the inner yoke and the floor surface of the accommodation grooves at a highest position during reciprocal movement of the bobbin (40). Furthermore, the distal end of the inner yoke (50a) may function as a stopper configured to restrain movement of the bobbin (40) to a section other than a designed specification.

Referring to FIGS. 2 and 3, according to the first exemplary embodiment of the present disclosure, a support protrusion (70) may be integrally and protrusively formed at an upper surface of the housing member (50). The support protrusion (70) may be mounted at a position near to four corner areas of the housing member (50), but the present disclosure is not limited thereto, and may be mounted at four surfaces, if necessary.

The support protrusion (70) is mounted to keep the upper elastic member (44) off the housing member (50) at a predetermined distance, such that the arranged position may be changed as much as desired according to design of the camera module. This is to prevent the bobbin and the housing member from interfering when the bobbin moves downwards. However, it is preferable that the support protrusion (70) be arranged at the corner area where there is a relatively sufficient installation space, and where there is generally no interference with other elements in the camera module.

The support protrusion (70) is preferably configured along with the housing member (50) when the housing member (50) is formed. For example, when the housing member (50) is formed using a press working, the support protrusion (70) may be configured by pressing and changing a position where the support protrusion is to be formed in a protruded shape.

The housing member (50) functions as a yoke by being formed with a metal material, and when the support protrusion (70) is formed by press working, an inner area of an upper surface formed with the support protrusion (70) of the housing member (50) may be formed with a concaved recess portion as shown in FIGS. 4 to 6. If the housing member (50) is injection molded, it is possible to form a shape of the support protrusion (70) inside a mold. When the support protrusion (70) is provided in an integrated configuration with the housing member (50) instead of a separate part or element, the number of parts may be reduced because of no need of using a separate spacer.

FIGS. 4, 5 and 6 are schematic views illustrating a process of movement of upper elastic member (44) according to movement of bobbin when the upper elastic member (44) is mounted at an upper side of the support protrusion (70) according to the first exemplary embodiment of the present disclosure.

The upper elastic member (44) is such that the first fixation part (44a) coupled to the housing member, the second fixation part (44c) coupled to the bobbin and the connection part (44b) maintain a horizontal state at an initial position as illustrated in FIG. 4, and when the bobbin rises as illustrated in FIG. 5, the first fixation part (44a) maintains the fixed position to raise the second fixation part (44c) connected to the bobbin (40) and connection part (44b) upwards of the support protrusion (70). In this case, there is generated no interference between the housing member (50) and the upper elastic member (44).

Furthermore, when the bobbin (40) descends to a direction of the image sensor (11, see FIG. 1) as illustrated in FIG. 6, the first fixation part (44a) maintains a fixed position to descend the second fixation part (44c) connected to the bobbin (40) and the connection part (44b) downwards of the support protrusion (70). In this case, there is generated no interference between the housing member (50) and the upper elastic member (44) because the connection part (44b) and the second fixation part (44c) move to a space formed by the support protrusion (70). Thus, the bobbin (40) can be smoothly ascended or descended without a separate configuration of spacer. The height of the support protrusion (70) may have at least a height greater than a stroke distance of the bobbin (40) for movement in FIGS. 4 to 6.

Meanwhile, as illustrated in FIGS. 4 to 6, the first fixation part (44a) may be pressed and supported at an upper surface by the support protrusion (70) of the cover member (60), and may be pressed and supported at a floor surface by the support protrusion (70). At this time, the first fixation part (44a) may further include a concaved groove portion (80) to tightly secure the first fixation part (44a) to the support protrusion (70). The groove portion (80) may be fixed to the first fixation part (44a) by adhesion, heat-seal and welding methods.

Meantime, each of the support protrusion (70) and the support boss (61) may be formed at a mutually opposite position, where each area contacting upper and bottom surfaces of the first fixation part (44a) may have the same shape and surface area as those of opposite surfaces. However, the present disclosure is not limited thereto, and a distal end of the support protrusion (70) and the support boss (61) may be provided to have a mutually different area.

Furthermore, although FIGS. 4 to 6 have illustrated an example of the groove portion (80) formed on a surface opposite to the support protrusion (70) of the first fixation part (44a), the present disclosure is not limited thereto, and the groove portion (80) may be formed at an upper surface to correspond to the support protrusion (70). In this case, the fixation using the adhesion, heat-seal or welding may be performed by the support boss (61) instead of the support protrusion (70).

Meanwhile, albeit not illustrated, the groove portion (80) may be formed by a through hole. In this case, the through hole may be coupled by the support protrusion (70) and/or by the support boss (61), where the coupled area may be fixed by any one of welding, heat-seal and adhesion methods.

Meanwhile, FIGS. 7 to 11 are exemplary views illustrating various modified examples of a camera module according to a first exemplary embodiment of the present disclosure.

Figure 7:
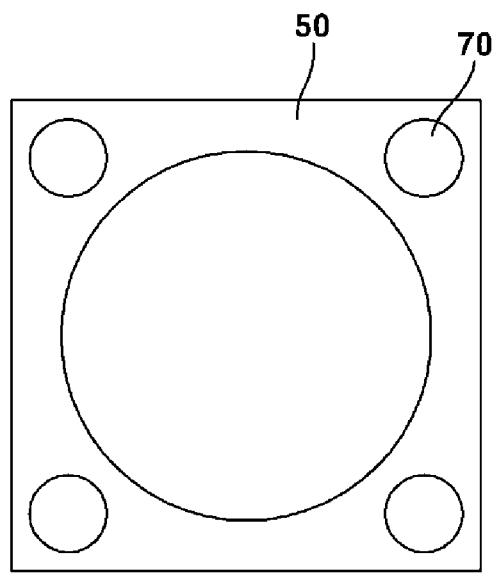
FIGS. 7 to 11 are exemplary views illustrating various modified examples of a camera module according to a first exemplary embodiment of the present disclosure.
Figure 8:
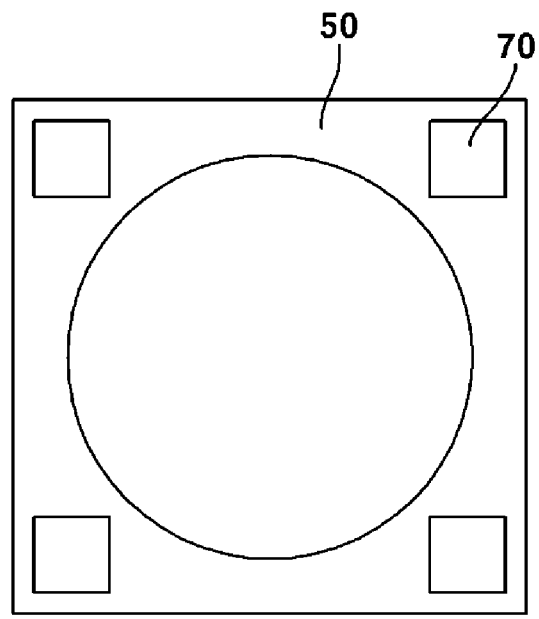
Figure 9:
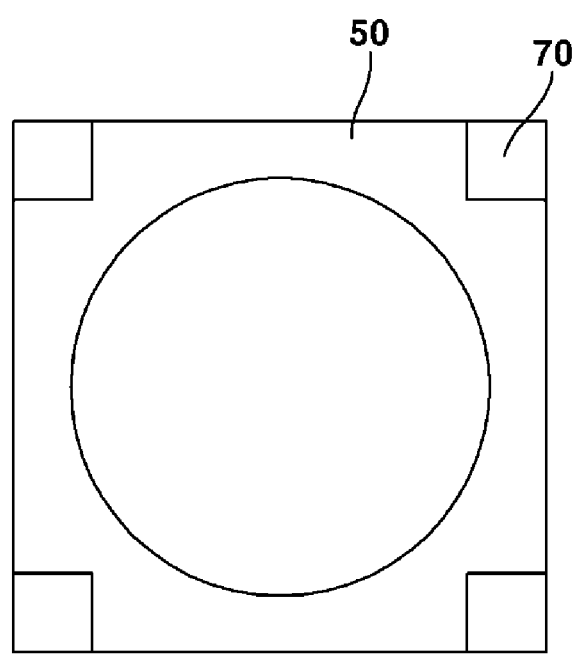

As one of examples, the plane shape of the support protrusion (70) may be formed in a round shape as illustrated in FIG. 7, and the support protrusion (70) may be configured to take a cylindrical shape. Alternatively, the plane shape of the support protrusion (70) maybe formed in a square shape as illustrated in FIGS. 8 and 9, and the support protrusion (70) may be configured to take a rectangular parallelepiped shape. Furthermore, the plane shape of the support protrusion (70) maybe formed in a triangular shape as illustrated in FIGS. 10 and 11, and the support protrusion (70) may be configured to take a triangular pillar shape.

Figure 10:
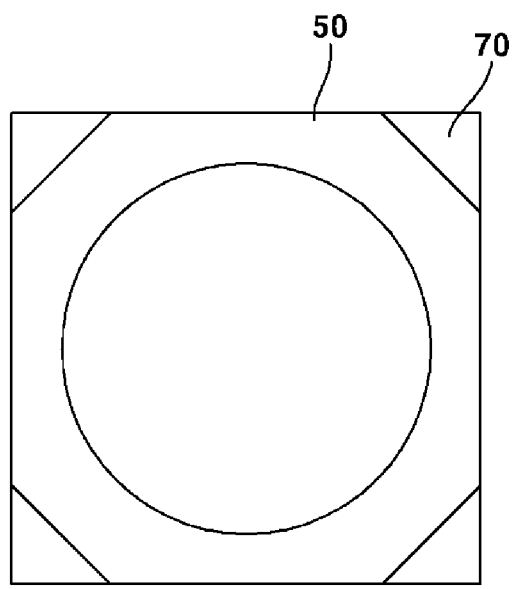
Figure 11:
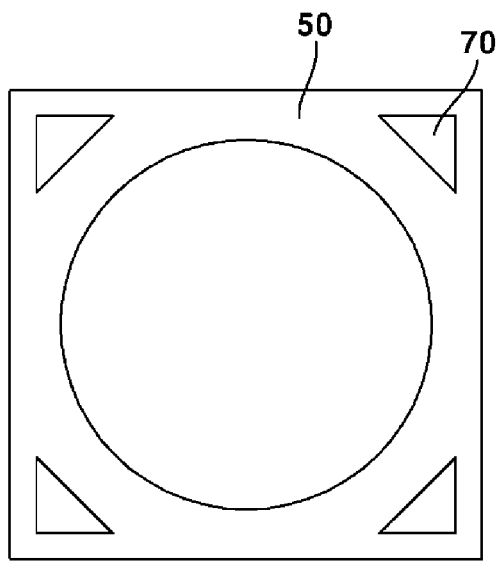

Meanwhile, as illustrated in FIGS. 7, 8 and 11, the support protrusion (70) may be spaced apart from a corner area connected to a lateral wall of the housing member (50) at a predetermined distance, and as illustrated in FIGS. 9 and 10, the support protrusion (70) may be so formed as to be closely contacted to a corner area connected to a lateral wall of the housing member (50).

The shapes of the support protrusion (70) according to the abovementioned exemplary embodiments may be selectively used, as required, within a scope not interfering with other elements when shape and size of the upper elastic member (44) and external look of the camera module are changed.

According to the first exemplary embodiment thus described, the support protrusion (70) may be integrally formed by change of upper surface of the housing member (50) without a separate spacer element, whereby the assembly process for spacer assembly can be dispensed with for convenient assembly work. Furthermore, there is an advantageous effect of reducing the number of parts or elements to thereby reduce the manufacturing cost, and solving the erroneous operation caused by inevitable inflow of foreign objects into a gap between connected areas of parts.

Hereinafter, a second exemplary embodiment of the present disclosure will be described with reference to accompanying drawings.

Figure 12:
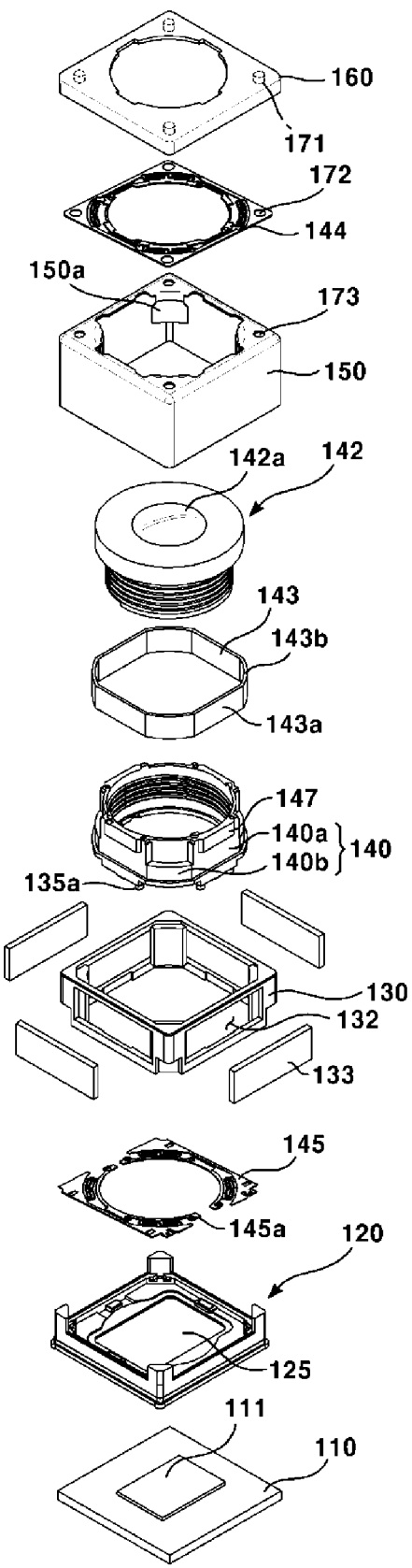
FIG. 12 is an exploded perspective view illustrating a camera module according to a second exemplary embodiment of the present disclosure.
Figure 13:
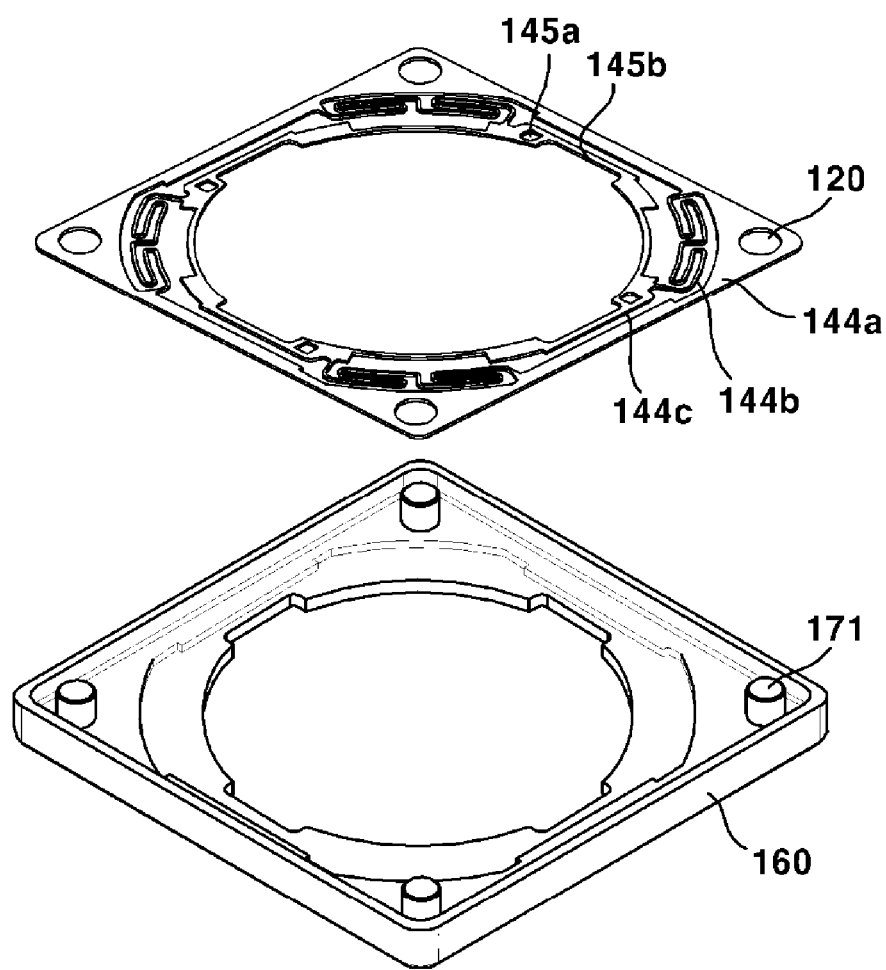
FIG. 13 is an exploded perspective view illustrating a cover member and an upper elastic member of a camera module according to a second exemplary embodiment of the present disclosure.
Figure 14:
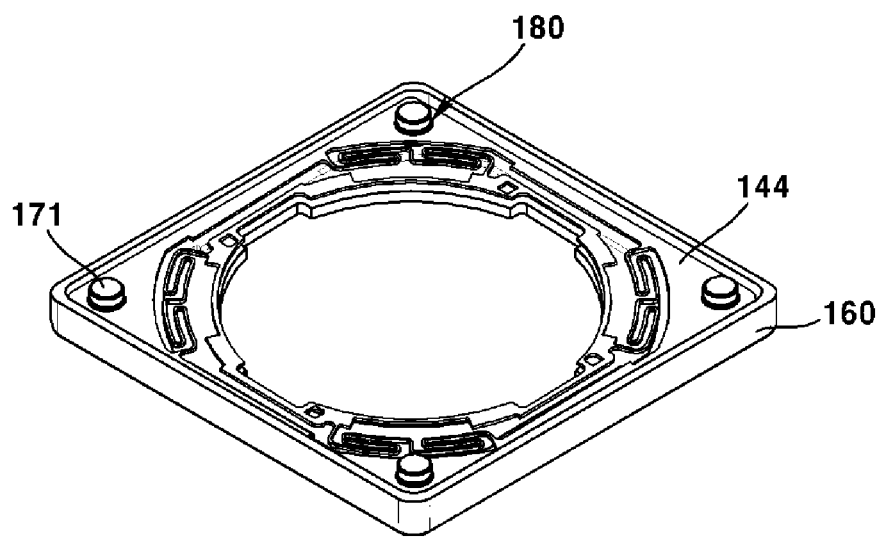
FIG. 14 is a perspective view illustrating an assembled state of FIG. 13.
Figure 15:
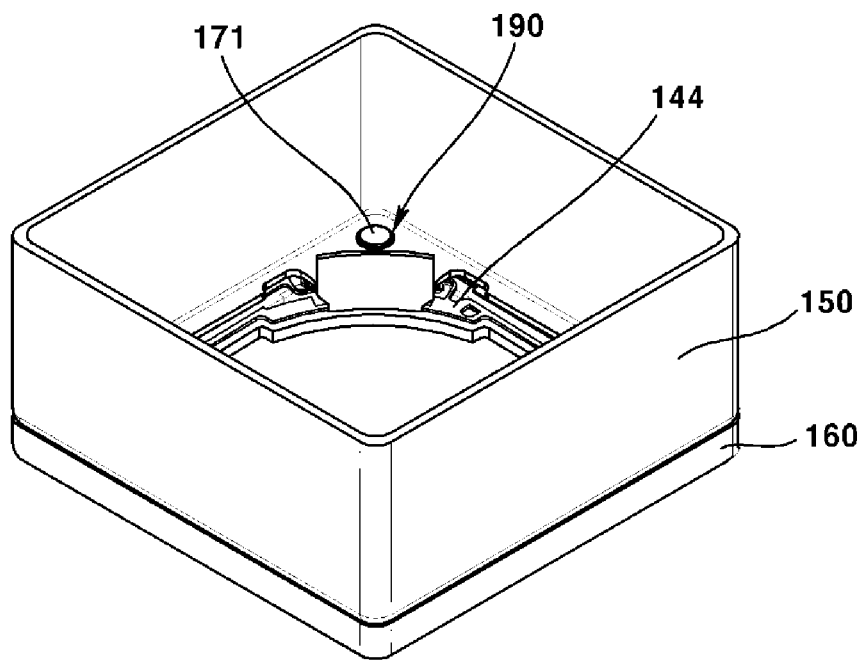
FIG. 15 is a rear perspective view illustrating an assembled state of a housing member, an upper elastic member and a cover member of a camera module according to a second exemplary embodiment of the present disclosure.
Figure 16:
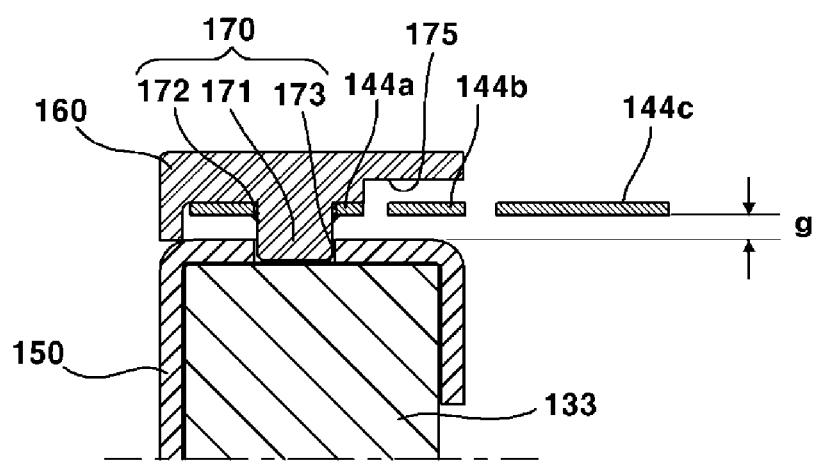
FIGS. 16, 17 and 18 are schematic view illustrating movement of upper elastic member of a camera module according to a second exemplary embodiment of the present disclosure.
Figure 17:
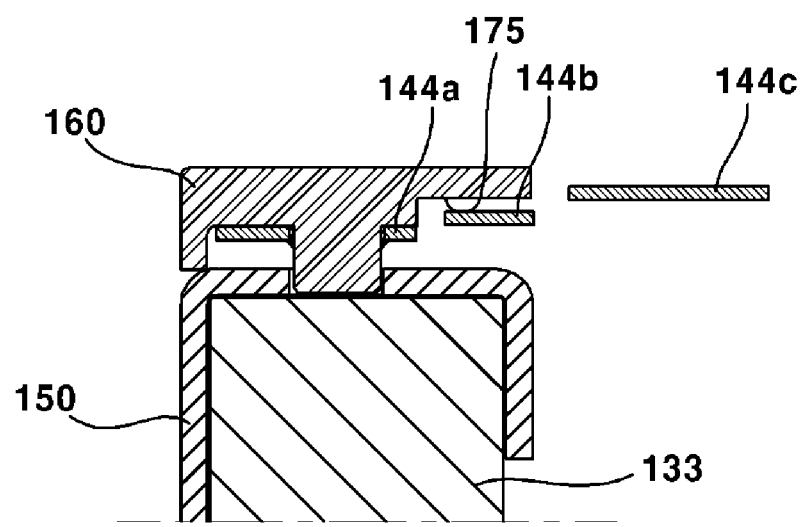
Figure 18:
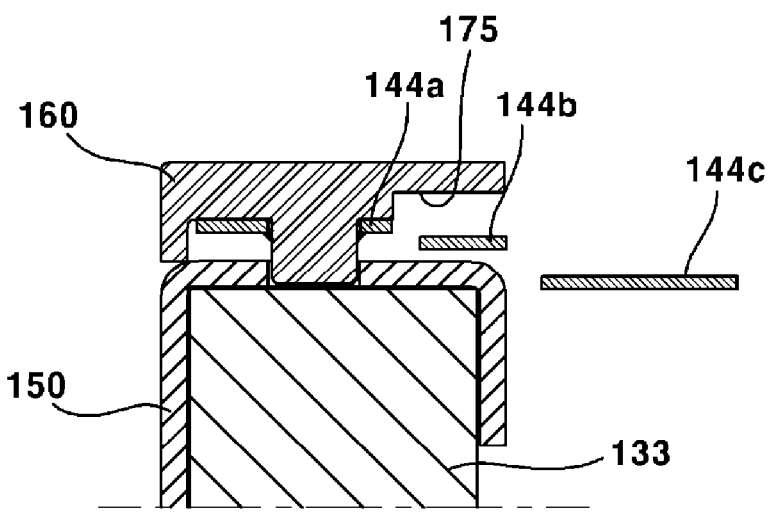
Figure 19:
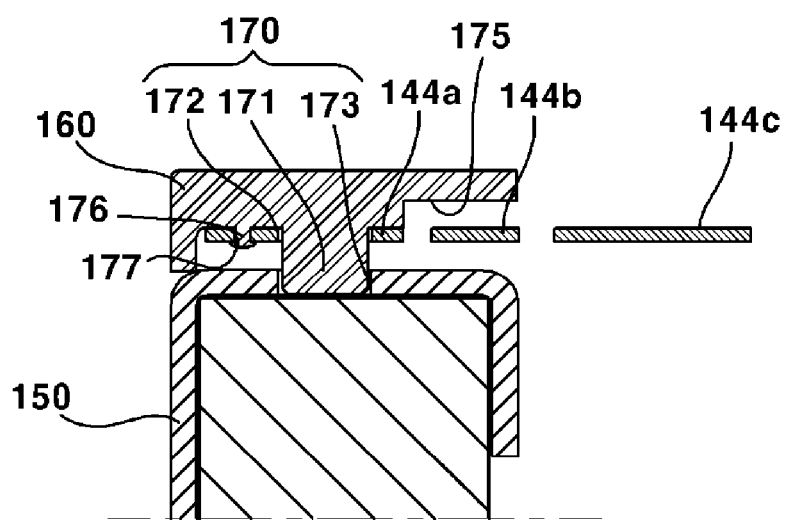
FIG. 19 is a schematic view illustrating a coupled state of a cover member and an upper elastic member of a camera module according to a modified example of a second exemplary embodiment of the present disclosure.
Figure 20:
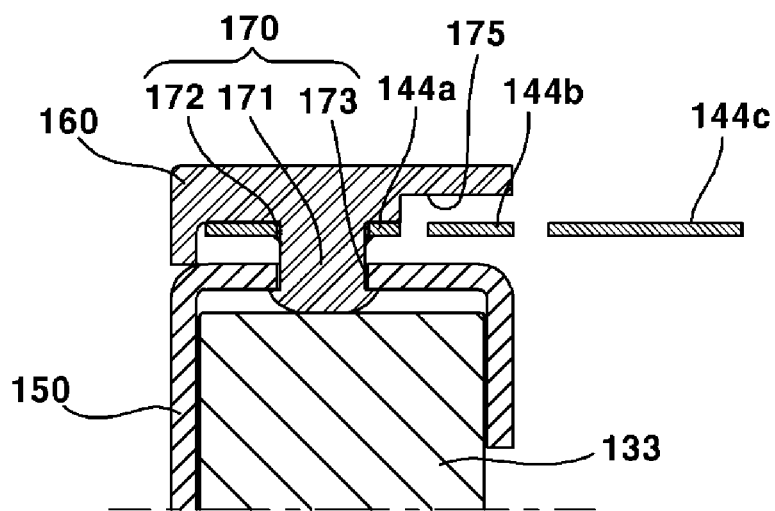
FIG. 20 is a schematic view illustrating a coupled state of a cover member and an upper elastic member of a camera module according to another modified example of a second exemplary embodiment of the present disclosure.

FIG. 12 is an exploded perspective view illustrating a camera module according to a second exemplary embodiment of the present disclosure, FIG. 13 is an exploded perspective view illustrating a cover member and an upper elastic member of a camera module according to a second exemplary embodiment of the present disclosure, FIG. 14 is a perspective view illustrating an assembled state of FIG. 13, FIG. 15 is a rear perspective view illustrating an assembled state of a housing member, an upper elastic member and a cover member of a camera module according to a second exemplary embodiment of the present disclosure, FIGS. 16, 17 and 18 are schematic view illustrating movement of upper elastic member of a camera module according to a second exemplary embodiment of the present disclosure, FIG. 19 is a schematic view illustrating a coupled state of a cover member and an upper elastic member of a camera module according to a modified example of a second exemplary embodiment of the present disclosure, and FIG. 20 is a schematic view illustrating a coupled state of a cover member and an upper elastic member of a camera module according to another modified example of a second exemplary embodiment of the present disclosure.

Referring to FIG. 12, a camera module according to a second exemplary embodiment of the present disclosure may include a PCB (110), a base (120), a bobbin (140), a housing member (150) and a cover member (160). Although the camera module may include a holder member (130) as illustrated in FIG. 12, the holder member may be omitted, if necessary.

The PCB (110) may be mounted with an image sensor (111) to form a floor surface of the camera module.

The base (120) may be mounted with an IR (Infrared) cut-off filter (125) at a position corresponding to that of the image sensor (111) to support a bottom side of the housing member (150). The base (120) may be mounted with a separate terminal member to electrically conduct with the PCB (110), and may be integrally formed with the terminal member using a surface electrode. Meanwhile, the base (120) may function as a sensor holder to protect the image sensor (111), and in this case, a protrusion part may be formed to a bottom side direction along a lateral surface of the base (120). However, the protrusion part is not an essential part and albeit not being illustrated in FIG. 2, a separate sensor holder may be arranged at a bottom surface of the base (120) to perform the role of the protrusion part.

The holder member (130) may take an approximately square shape, and may be formed with magnet installation holes (132) mountable with a plurality of magnets (133) at four surfaces thereof. Alternatively, albeit not being illustrated, mounting holes may be formed instead of the magnet installation holes (132). At this time, each of the magnets (133) may be formed in a corresponding size, and facing magnets (133) may be arranged in parallel.

Meantime, although the magnets (133) are arranged on four lateral walls of the holder member (130) in the second exemplary embodiment, the present disclosure is not limited thereto, and the magnets (133) may be arranged on four corner areas of the holder member (130). The holder member (130) is not an essential configuration, and may be omitted. When the holder member (130) is omitted, the magnets (133) may be directly secured to the housing member (150, described later). When the magnets (133) are directly secured to the housing member (150), the magnets (133) may be directly bonded to a lateral surface or corners of the housing member (150).

An upper surface of the magnet (133) may contact an inner surface of an upper side of the housing member (150). When the number of surfaces of the housing member (150) surface-contacting the magnet (133) is great, there may be an effect of interrupting a magnetic field when the housing member (150) is made of a metal material. Furthermore, at least two surfaces of the magnet (133) may contact the housing member (150).

Referring to FIG. 12, the holder member (130) may take a shape of a cubic with four surfaces provided with thin frame shapes, and an upper side and a bottom side of the holder member (130) may be mounted with upper and bottom elastic members (144, 145, described later) to elastically support the reciprocal movement of the bobbin (140) to an axial direction. The holder member (130) may be integrally formed as illustrated in FIG. 12. The present disclosure is not limited thereto, and the holder member (130) may be provided with an upper portion and a bottom portion being as separable.

A floor surface of the holder member (130) may be coupled to the base (120), and an upper surface of the holder member (130) may be coupled to the housing member (150, described later) to be fixed in position. Absent the holder member (130), the bottom elastic member (145) may be supported by the base (120), and the upper elastic member (144) may be supported by the housing member (150).

The bobbin (140) may be reciprocally mounted at an inside space of the housing member (150) to a direction parallel to an optical axis. The bobbin (140) may be mounted at a periphery with a coil unit (143) to enable an electrical interaction with the magnets (133). The bobbin (140) may include a lens barrel (142) mounted therein with at least one lens (142*a*). The lens barrel (142) may be so formed as to be screwed into the bobbin (140) as illustrated in FIG. 12. However, the present disclosure is not limited thereto, and the lens barrel (142) may be directly fixed to an inside of the bobbin (140) by other methods than the screwing method, or one sheet or more sheets of lenses (142*a*) may be integrally formed with bobbin (140) without the assistance of lens barrel (142). The lens (142*a*) may be formed with one sheet, or two or more lenses may form an optical system.

Meanwhile, the bobbin (140) may be mounted at an upper surface and a bottom surface with upper elastic member (144) and a bottom elastic member (145). The upper elastic member (144) may be connected at one end to the bobbin (140) and connected at the other end to an upper side of the housing member (150, described later). The bottom elastic member (145) may be connected at one end to the bobbin (140) and connected at the other end to the base (120). To this end, the bobbin (140) may be formed at a bottom side with a protrusion (135*a*) for coupling with the bottom elastic member (145), and a protrusion accommodation hole (145*a*) may be formed at a position corresponding to that of the bottom elastic member (145), whereby the bottom elastic member (145) can be secured.

Now, referring to FIG. 13, the upper elastic member (144) may be also formed with a protrusion accommodation hole (145*a*) and/or an accommodation groove (145*n*), the coupling of which enables the fixation of the upper elastic member (144). Furthermore, the upper elastic member (144) may include, as illustrated in FIG. 13, a first fixation part (144*a*) fixed to the cover member (160) side, a second fixation part (144*c*) connected to a bobbin (140) side, and a connection part (144*b*) configured to connect the first and second fixation parts (144*a*, 144*c*). At this time, the connection part (144*b*) may take a shape of a predetermine pattern, the movement of which enables the vertical movement of the bobbin (140). The connection part (144*b*) may be so arranged as not to be interfered with a staircase part (175) of the cover member (160, described later).

Referring to FIG. 16, the connection part (144*b*) may be a starting point of the staircase part (175), whereby the cover member is prevented from interfering with the connection part (144b) while the bobbin (140) vertically moves. Alternatively, the connection part (144b) may be spaced apart from the starting point of the staircase part (175) at a predetermined distance.

Furthermore, the upper elastic member (144) may be spaced apart from an upper surface of an inner surface of the cover member (160) coupled by the housing member (150) at a predetermine distance in order to prevent the cover member (160) from interfering with the magnet (133) while the bobbin (140) vertically moves. The connection part (144b) of the upper elastic member may be positioned at a position spaced apart from the magnet to a horizontal direction. The connection part (144b) of the upper elastic member may be positioned at a position spaced apart from the magnet to a vertical direction. Furthermore, the connection part (144b) of the upper elastic member may be positioned at a position spaced apart from the magnet to a diagonal direction, where the diagonal direction may include a diagonal direction relative to a horizontal direction, and a diagonal direction relative to a vertical direction.

Meantime, the first fixation part (144a) may be formed longer than the second fixation part (144c), and at least 13 pairs of connection parts (144b) may be diagonally arranged, each spaced apart to a lengthwise direction at a predetermined distance. At this time, the connection part (144b) may take a predetermined pattern, whereby the bobbin (140) can be supported. The connection part (144b) may also integrally connect the first and second fixation parts (144a, 144c).

That is, the connection part (144b) may be connected at one end to the first fixation part (144a) and connected at the other end to the second fixation part (144c). The connection part (144b) may be also so arranged as not to interfere with the cover member (160) and the magnets (133). The connection part (144b) may perform an elastic restoring function of the upper elastic member (144). The upper elastic member (144) may be spaced apart from an upper surface of the housing member (150) performing the role of yoke at a predetermined distance (g).

That is, the upper elastic member (144) may be first coupled to an inner surface of the cover member (160) in order to prevent the bobbin (140) from interfering with the housing member (150) when the bobbin (140) vertically moves. At this time, the upper elastic member (144) may be spaced apart from the upper surface of the housing member (150) at a predetermined distance (g) (See FIG. 16). At this time, the distance (g) may be formed longer than a falling stroke distance of the bobbin (140) to prevent the upper elastic member (144) from interfering with the housing member when the bobbin (140) performs a descending operation. The configuration of forming the distance (g) may be formed by the staircase part (175) formed at an inner side of the cover member (160, described later).

To this end, an upper side of an inner surface of the cover member (160), the housing member (150) and the upper elastic member (144) may be respectively formed with a complementarily formed upper elastic member fixation part (170), as illustrated in FIG. 16. The upper elastic member fixation part (170) may include a support protrusion (171), a first through hole (172) and a second through hole (173), the configuration of which enables formation of upper elastic member fixation part (170) on the cover member (160) that is drivable to an upper side and a bottom side. Particularly, the cover member (160) may be formed with a shape having more than two stairs.

That is, the cover member (160) may be formed with the upper protrusion (171), where the upper protrusion (171) may be piercingly coupled to the upper elastic member (144). Furthermore, the cover member (160) and the upper elastic member (144) may be fixed on the support protrusion (171) by heat seal, or fixed using an adhesive after assembly of the upper elastic member (144) to the support protrusion (171), and the cover member (160) may be fixed by press-fitting the support protrusion (161) and the upper elastic member (144). Furthermore, the support protrusion (171) may be piercingly coupled to a second through hole (173) formed on the housing member (150) performing a role of yoke, or partially inserted into the second through hole and coupled.

Referring to FIG. 16, when the support protrusion (171) is formed to correspond to the first through hole (172) of the upper elastic member (144) and the second through hole (173) of the housing member (150), the support protrusion (171) may be coupled to the first and second through holes (172, 173), and at this time, the support protrusion (171) and the upper elastic member (144) may be bonded at a first coupling part (180), and the support protrusion (171) and the housing member (150) may be fused or bonded at a second coupling part (190).

In order to fuse the upper elastic member (144) on the support protrusion (171), an auxiliary support protrusion (176) may be formed near the support protrusion (171) in addition to the support protrusion (171), and an auxiliary through hole (177) may be formed at a position corresponding to that of the auxiliary support protrusion (176) of the upper elastic member (144), where the fixation of the upper elastic member (144) may be performed through heat seal, as illustrated in FIG. 19.

Furthermore, as illustrated in FIG. 20, in order to fuse or bond the housing member (150) and the cover member (160), a length of the support protrusion (171) is made longer to allow being inserted deep into an inner space part of the housing member (150), whereby the cover member (160) can be fixed to the housing member (150) by changing a shape of a distal end of the support protrusion (171) through heat seal, or an adhesive may be coated for fixation of the cover member (160) to the housing member (150).

Meantime, as illustrated in FIGS. 16 to 18, an end of the support protrusion (171) may be so formed as not to protrude from an inner surface of the housing member (150). At this time, when the magnet (133) is mounted at a corner area of the housing member (150), the magnet (133) may surface-contact three surfaces, that is, both lateral surfaces and an upper surface of the housing member (150). Furthermore, when the support protrusion (171) protrudes from an inner surface of the housing member (150) to a direction facing the magnet (133), an end of the support protrusion (171) may be brought into contact with the magnet (133), where the magnet (133) may contact two areas, that is, both lateral surfaces of the housing member (150).

The bi-directional movement of the bobbin (140) may be elastically supported relative to an optical axis direction by the upper and bottom elastic members (144, 145) thus coupled. That is, the bobbin (140) may be controlled in upward and downward movements about an initial position spaced apart from the base (120) at a predetermined distance.

Meantime, the coil unit (143) may be provided as a ring-shaped coil block coupled to a periphery of the bobbin (140). The coil unit (143) formed in the shape of a coil block may include a straight line surface (143a) arranged at a position corresponding to that of the magnet (133) and a curved line surface (143b) arranged at a position corresponding to that of an inner yoke and an accommodation groove (described later).

Alternatively, the coil block-shaped coil unit (143) may take an angled shape, and may be of an octagonal shape. That is, the coil unit (143) may be formed with a straight line surface free from curved line, where the shape of which is proposed in consideration of electromagnetic action with the oppositely-arranged magnet (133), and when a surface opposite to the magnet (133) is a plan, a surface of the facing coil unit (143) may be also a plan to thereby maximize the generation of electromagnetic force. However, the present disclosure is not limited thereto, and a surface of the coil unit (143) and a surface of the magnet (133) may be all curved or plain, or one of the surface of the coil unit (143) and the surface of the magnet (133) may be curved while the remaining may be plain.

Meantime, the bobbin (140) may include a first surface (140a) flatly formed on a surface corresponding to that of the straight line surface (143a) to allow the coil unit (143) to be coupled to a periphery of the bobbin (140), and a second surface (140b) formed in a round shape on a surface corresponding to that of the curved line surface (143b). Furthermore, the coil unit (143) may be directly wound on the bobbin (140), and in this case, the first surface (140a) may be formed with a protrusion part (147) configured to prevent the coil unit (143) from being deviated to an optical axis direction of the coil unit (143), whereby the coil unit (143) can be prevented from being deviated from an installation position by the shock generated during the reciprocal movement of the bobbin (140), or the arranged position of the coil unit (143) may be guided.

Furthermore, the bobbin (140) may be formed at a periphery with a plurality of accommodation grooves (not shown) forming a space part by being spaced apart from the coil unit (143) at a predetermined distance, where the plurality of accommodation grooves (not shown) may be inserted by an inner yoke (150a) formed on the housing member (150). The present disclosure is not limited thereto, and a separate yoke may be provided instead of the inner yoke (150a). At this time, the housing member (150) may be a yoke housing configured to function as a yoke.

The housing member (150) may be formed with a ferromagnetic body such as steel. Furthermore, the housing member (150) may be provided with an angled shape when viewed from an upper side in order to wrap the bobbin (140). At this time, the housing member (150) may take a square shape, as illustrated in FIGS. 12, 13 and 14, or an octagonal shape, albeit not being illustrated.

When the housing member (150) takes an octagonal shape when viewed from an upper side, and when a shape of the magnet (133) arranged at a corner of the housing member (150) takes a trapezoidal shape when viewed from an upper side, the magnetic field emitted from the corner of the housing member (150) can be minimized.

The housing member (150) may be integrally formed with an inner yoke (150a) at a position corresponding to that of the accommodation groove, and one surface of the inner yoke (150a) is spaced apart from the coil unit (143) at a predetermined distance, and the other surface of the inner yoke (150a) may be spaced apart from the bobbin (140) at a predetermined distance.

Furthermore, the inner yoke (150a) and the accommodation groove (not shown) may be formed at four corner areas of the housing member (150). The inner yoke (150a) may be bent inward in a direction parallel with an optical axis from an upper surface of the housing member (150). The inner yoke (150a) may be symmetrically formed with a pair of escape grooves at a position near to the bent portion. The bent portion formed with the escape grooves may form a bottleneck section, and interference of the inner yoke (150a) and the bobbin (140) can be minimized during movement of the bobbin (140) by the section where the escape grooves are formed.

A distal end of the inner yoke (150a) needs to be spaced apart at a reference position at a predetermined distance from a floor surface of the accommodation groove, which is to prevent interference and contact between and with a distal end of the inner yoke and the floor surface of the accommodation grooves at a highest position during reciprocal movement of the bobbin (140). Furthermore, the distal end of the inner yoke (150a) may function as a stopper configured to restrain movement of the bobbin (140) to a section other than that of a designed specification.

The cover member (160) may be coupled to an upper side of the housing member (150) to fix the first fixation part (144a) of the upper elastic member (144) coupled to an upper side of the bobbin (140). An external surface and/or an inner surface of the cover member (160) may be formed with a staircase part (175) as mentioned above.

The staircase part (175) prevents the connection part (144b) from interfering with an inner surface of the cover member (160) when the upper elastic member (144) vertically moves in response to the movement of the bobbin (140). At this time, the staircase part (175) may be formed only on the inner surface as illustrated. But the present disclosure is not limited thereto, and the staircase part may be formed on both the inner surface and the external surface when the staircase part is formed by press work.

For example, as illustrated in FIGS. 13 and 16, the staircase part (175) may be formed at an inner side of the cover member (160), and the staircase part (175) may be so formed as to prevent the upper elastic member (144) and an inner side of the cover member (160) from being interfered when the upper elastic member (144) moves upwards. That is, the staircase part (175) is formed from an inner surface of the cover member (160) to a bottom side direction, and the support protrusion (171, described later) is protrusively formed to a bottom side direction from the staircase part (175) to prevent the upper elastic member (144), the cover member (160), the upper elastic member (144) and the housing member (150) from interfering. The staircase part (175) may be so formed as to support the first fixation part (144a) of the upper elastic member (144), and may be smaller than, greater than or corresponding to the first fixation part (144a).

The cover member (160) may have a shape corresponding to that of the housing member (150), and may include therein a space part formed by the staircase part (175). The size of the space part may be greater than a width and a thickness of the upper elastic member (144), and even if the upper elastic member (144) is changed in shape by the movement of the bobbin (140), the housing member (150) and an inner surface of the cover member (160) are prevented from interfering with the housing member (150).

Meanwhile, a reference surface at the actuator of VCM method thus described may be an upper surface of the housing member (150) and a bottom surface of the cover member (160) at the time of assembly stage. When the reference surface is set up, the separate spacer is not required as mentioned above to thereby reduce the number of parts, whereby tolerance stack and the number of processes can be reduced because of the reduced number of parts.

Furthermore, an upper side of the inner space part at the cover member (160) may be formed with a plurality of support protrusions (171) protrusively formed to a direction facing the housing member (150). The support protrusion (171) may be formed with an approximately cylindrical shaped boss. However, the present disclosure is not limited thereto, and may be formed in various shapes such as a triangular pillar, a square pillar and a polygonal shape. Thus, assembly of the cover member (160) and the housing member (150) may be guided by coupling between the support protrusions (171) and the second through hole (173), and fixation thereof may be realized by bonding or heat-seal and other methods. However, the present disclosure is not limited thereto, and other various methods may be applied for fixation such as welding and taping.

Meantime, the support protrusion (171) may be integrally formed with the cover member (160) as one body. For example, when the cover member (160) is formed with a metal material using press works, it is possible to form the cover member (160) by protrusively changing the shape of a part of the support protrusion (171). Alternatively, when the cover member (160) is injection molded using resin material, the support protrusion (171) may be shaped in a mold to thereby form the cover member (160).

Meantime, an upward side of an inner surface formed with the support protrusion (171) of the cover member (160) may have a concaved groove part. When the support protrusion (171) is integrally formed with the housing member (150) instead of a separate part, the number of parts can be reduced because there is no need of using a separate spacer. Furthermore, the assembly process for the spacer can be omitted to further simplify the overall assembly process.

The support protrusions (171) may be mounted at a position near to four corner areas at an upper side of the inner surface of the cover member (160). However, the present disclosure is not limited thereto, and the support protrusions (171) may be formed at four surfaces. The support protrusion (171) is to fix an upper surface of the upper elastic member (144) and the housing member (150) by spacing apart at a predetermined distance, such that arranged position may be variably changed depending on design of the camera module. In view of the fact that corner areas are generally where there is a relatively sufficient space that is not interfered with other parts in the camera module, the support protrusions (171) may be arranged at corners on a surface opposite to the housing member (150) of an inner surface of the cover member (160).

Meanwhile, a first through hole (172) having a shape corresponding to that of the support protrusion (171) may be piercingly formed at a position corresponding to that of the support protrusion (171) of the upper elastic member (144). The first through hole (172) may be formed at a first fixation part (144a) side. Of course, a part of the first through hole (172) may be overlappingly formed at a connection part (144b) side, but in view of the fact that the position of the connection part (144b) is a place where elastic transformation of the elastic members is generated, it is necessary that there be no interference with the pattern of the connection part (144b).

Although the first through hole (172) and the support protrusion (171) may be press-fitted, a first coupling part (180, see FIG. 14) may be formed at a coupled position using bonding using an adhesive or heat-seal for maintenance of more stable coupling state. As noted from the drawing, the first coupling part (180) may be formed at a coupled area between the first through hole (172) and the support protrusion (171), the present disclosure is not limited thereto, and the first coupling part (180) may be formed by directly bonding the upper elastic member (144) and an inner surface of the cover member (160).

Alternatively, the first coupling part (180) may be realized by performance of assembly process using a press-fitting process between the support protrusion (171) and the first through hole (172) instead of a process using any one of separate adhesive, welding and heat-seal methods. In this case, a diameter of the first through hole (172) may be smaller than that of the support protrusion (171).

The upper elastic member (144) may be initially assembled on an inner surface of the cover member (160) at the time of assembly, and then assembly of other parts may be performed thereafter. For example, connection/fixation between the upper elastic member (144) and the bobbin (140) may be performed after the upper elastic member (144) is fixed to the cover member (160) side.

Furthermore, a second through hole (173) may be piercingly formed at a position corresponding to that of the support protrusion (171). At this time, the second through hole (173) may be formed with an end of the support protrusion (171) having passed the first through hole (172) of the upper elastic member (144) by way of press-fitting process. At this time, a second coupling part (190, see FIG. 15) may be formed at a coupled position between the second through hole (173) and the support protrusion (171) using bonding or heat-seal process for maintenance of more stable coupled state. Furthermore, the housing member (150) may be formed at a position corresponding to that of the support protrusion (171) with a groove part instead of the through hole, and a separate through hole or groove part may not be formed.

If a groove part is formed, only a part of the end of the support protrusion (171) may be accommodated into the groove part. When the second coupling part (190) is formed, the cover member (160) may be fixed at an upper surface of the housing member (150) by coupling between the support protrusion (171) and the second through hole (173).

FIGS. 16, 17 and 18 are schematic view illustrating movement of upper elastic member of a camera module according to a second exemplary embodiment of the present disclosure.

At an initial position, the upper elastic member (144) is such that the first and second fixation parts (144a, 144c) and the connection part (144b) maintain a horizontal state as illustrated in FIG. 16, and when the bobbin (140) ascends as illustrated in FIG. 17, the first fixation part (144a) maintains a fixed position to allow the second fixation part (144c) connected to the bobbin (140) and the connection part (144b) to rise upwards of the support protrusion (171). In this case, there is generated no interference between the cover member (150) and the upper elastic member (144). Furthermore, as illustrated in FIG. 18, when the bobbin (140) descends to a direction of the image sensor (111, see FIG. 12), the first fixation part (144a) maintains a fixed position to allow the second fixation part (144c) connected to the bobbin (140) and the connection part (144c) to descend to a bottom side of the support protrusion (171). In this case, the upper elastic member (144) descends downwards maintaining a fixed state by coupling with the support protrusion (171), where, as the upper elastic member (144) and the housing member (150) are spaced apart at a predetermined distance (g) as illustrated in FIG. 16, there is no interference of an upper surface of the housing member (150) and the upper elastic member (144) even during the descent of the bobbin (140). Thus, the bobbin (140) can smoothly perform the ascent and descent movement even without a separate configuration of a spacer. A height of the support protrusion (171) may have at least a height more than a stroke distance of the bobbin (140) in order to have the movement of FIGS. 16 to 18.

The shape of the support protrusion (171) according to the above exemplary embodiments thus described may be selectively chosen as necessary within a scope where there is generated no interference with other parts when the shape and size of the upper elastic member (144) and an external look of the camera module are changed.

According to the second exemplary embodiment of the present disclosure, a support protrusion (171) can be integrally formed by changing the shape of an inner surface of the cover member (160) without a separate spacer part, whereby assembly process for a spacer can be omitted to further simplify the assembly process of the camera module. Furthermore, an effect of reducing the manufacturing cost in response to reduce number of parts can be accomplished and an erroneous operation caused by inducement of foreign objects into a gap between parts that inevitably occurs during assembly works of parts can be also solved.

Hereinafter, a third exemplary embodiment of the present disclosure will be described in detail with reference to the accompanying drawings.

Figure 21:
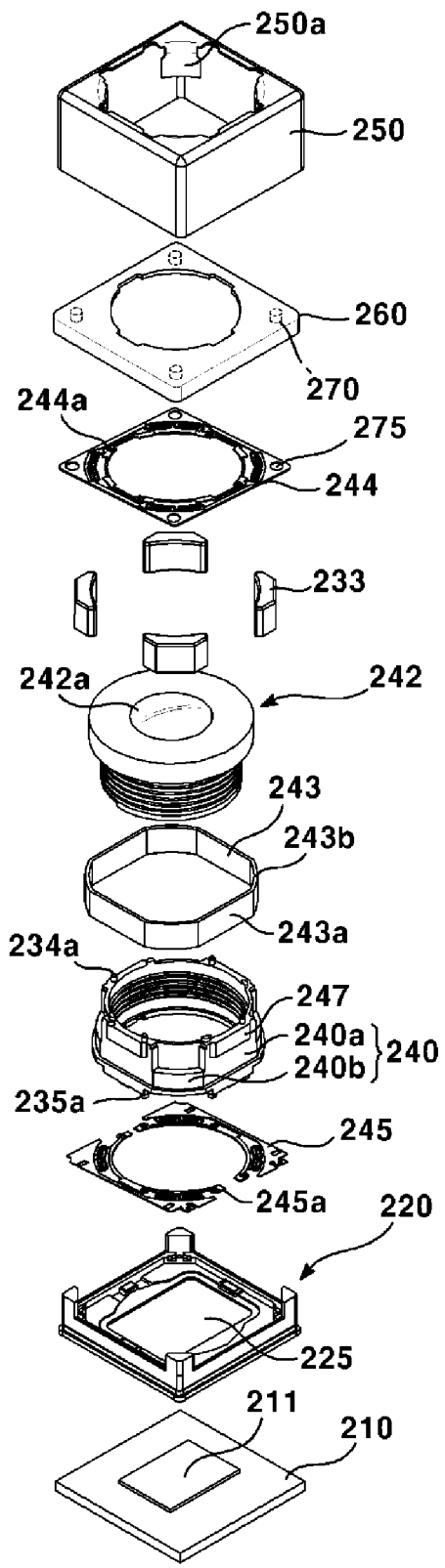
FIG. 21 is an exploded perspective view illustrating a camera module according to a third exemplary embodiment of the present disclosure.
Figure 22:
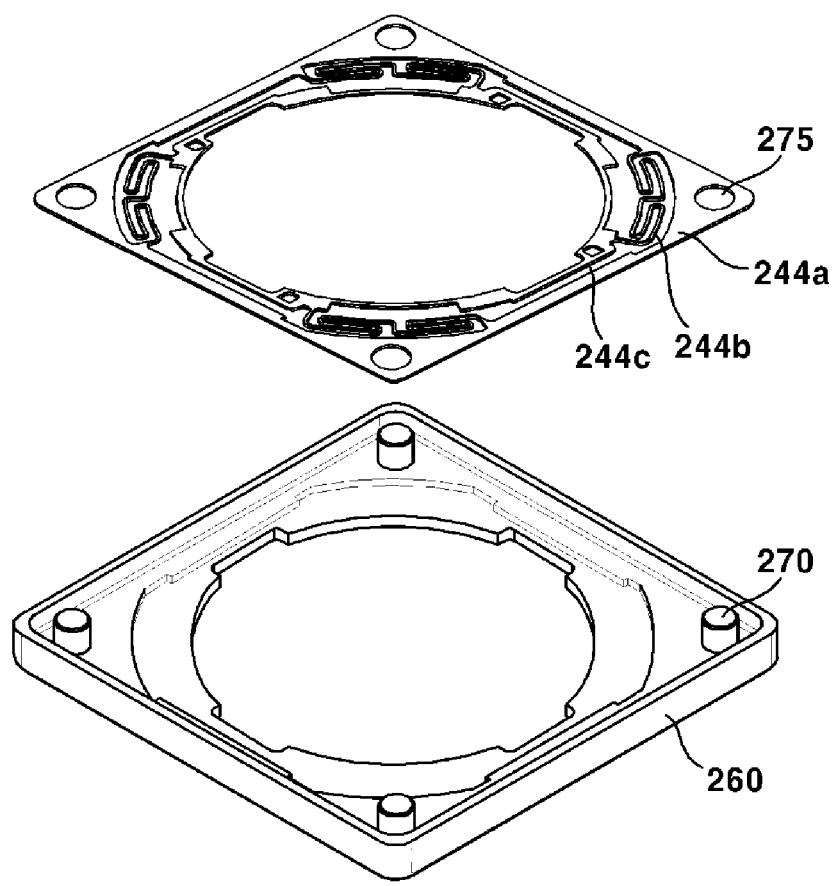
FIG. 22 is an exploded perspective view illustrating a spacer member and an upper elastic member of a camera module according to a third exemplary embodiment of the present disclosure.
Figure 23:
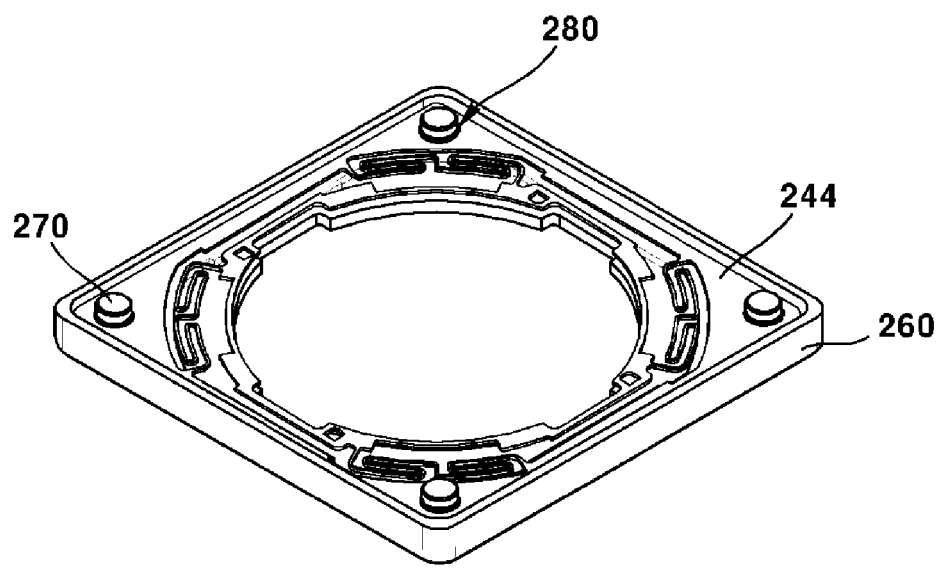
FIG. 23 is a perspective view illustrating an assembled state of FIG. 22.

FIG. 21 is an exploded perspective view illustrating a camera module according to a third exemplary embodiment of the present disclosure, FIG. 22 is an exploded perspective view illustrating a spacer member and an upper elastic member of a camera module according to a third exemplary embodiment of the present disclosure, FIG. 23 is a perspective view illustrating an assembled state of FIG. 22, and FIGS. 24, 25 and 26 are schematic view illustrating movement of upper elastic member of a camera module according to a third exemplary embodiment of the present disclosure.

Referring to FIG. 21, a camera module according to a third exemplary embodiment of the present disclosure may include a PCB (210), a base (220), a bobbin (240), and a housing member (250), and the housing member (250) may be formed therein with a spacer member (260).

The PCB (210) may be mounted with an image sensor (211) to form a floor surface of the camera module.

The base (220) may be mounted with an IR (Infrared) cut-off filter (225) at a position corresponding to that of the image sensor (211) and may be coupled to the housing member (250), and may support a bottom side of the housing member (250). The base (220) may be mounted with a separate terminal member to electrically conduct with the PCB (210), and may be integrally formed with the terminal member using a surface electrode. Meanwhile, the base (220) may function as a sensor holder to protect the image sensor (211), and in this case, a protrusion part may be formed to a bottom side direction along a lateral surface of the base (220). However, the protrusion part is not an essential part, and albeit not being illustrated in FIG. 2, a separate sensor holder may be arranged at a bottom surface of the base (220) to perform the role of the protrusion part.

Magnets (233) may be directly fixed to the housing member (250, described later). When the magnets (233) are directly fixed to the housing member (250), the magnets (233) may be directly bonded to a lateral surface or corner area of the housing member (250). Furthermore, the magnets (233) may contact at an upper surface a first fixation part (244a) of an upper elastic member (244). When the housing member (250) is made of a metal material, the cut-off effect of magnetic field can be more efficient if the number of surfaces of the housing member (250) contacting the magnets (233) is great.

Furthermore, at least two surfaces of the magnet (233) may contact the housing member (250). For example, when the magnet (233) takes a trapezoidal shape when viewed from a plan, the magnet (233) may contact at least more than one inner lateral surface of the housing member (250). Although the third exemplary embodiment illustrates that the magnets (233) are arranged at four corner areas of the housing member (250), the magnets (233) may be arranged at four inner surfaces of the housing member (250).

A bottom elastic member (245) may be supported by the base (220) and/or by housing member (250), and the upper elastic member (244) may be supported by a spacer member (260). At this time, the upper elastic member (244) may be coupled to a support protrusion (270) formed at the spacer member (260), and the bottom elastic member (245) may be interposed between the housing member (250) and the base (220).

The bobbin (240) may be reciprocally mounted at an inside space of the housing member (250) to a direction parallel to an optical axis. The bobbin (240) may be mounted at a periphery with a coil unit (243) to enable an electrical interaction with the magnets (233). The bobbin (240) may include a lens barrel (242) mounted therein with at least one lens (242a). The lens barrel (242) may be so formed as to be screwed into the bobbin (240) as illustrated in FIG. 21. However, the present disclosure is not limited thereto, and the lens barrel (242) may be directly fixed to an inside of the bobbin (240) by other methods than the screwing method, or one sheet or more sheets of lenses (242a) may be integrally formed with bobbin (240) without the assistance of lens barrel (242). The lens (242a) may be formed with one sheet, or two or more lenses may be arranged to form an optical system.

The bobbin (240) may be mounted at an upper surface and a bottom surface with upper elastic member (244) and a bottom elastic member (245). The upper elastic member (244) may be connected at one end to the bobbin (240) and may be assembled at an inner space part of the housing member (250) after being coupled to the spacer member (260) formed at an inner surface of the housing member (250). The bottom elastic member (245) may be connected at one end to the bobbin (240) and connected at the other end to an upper surface of the base (220). To this end, the bobbin (240) may be formed at a bottom side with a protrusion (235a) for coupling with the bottom elastic member (245), and a protrusion accommodation hole (245a) may be formed at a position corresponding to that of the bottom elastic member (245), whereby the bottom elastic member (245) can be secured.

The upper elastic member (244) may include, as illustrated in FIG. 22, a first fixation part (244a) connected to the spacer member (260) side, a second fixation part (244c) connected to the bobbin (240) and the first fixation member (244a), and a connection part (244b) configured to connect the first and second fixation parts (244a, 244c). At this time, the connection part (244b) may take a shape of a predetermine pattern, the movement of which enables the vertical movement of the bobbin (240). Furthermore, the connection part (244b) may be so arranged as not to be interfered with a staircase part (271) of the spacer member (260, described later). The connection part (244b) performs an elasticity restoring function of the upper elastic member (244).

Figure 24:
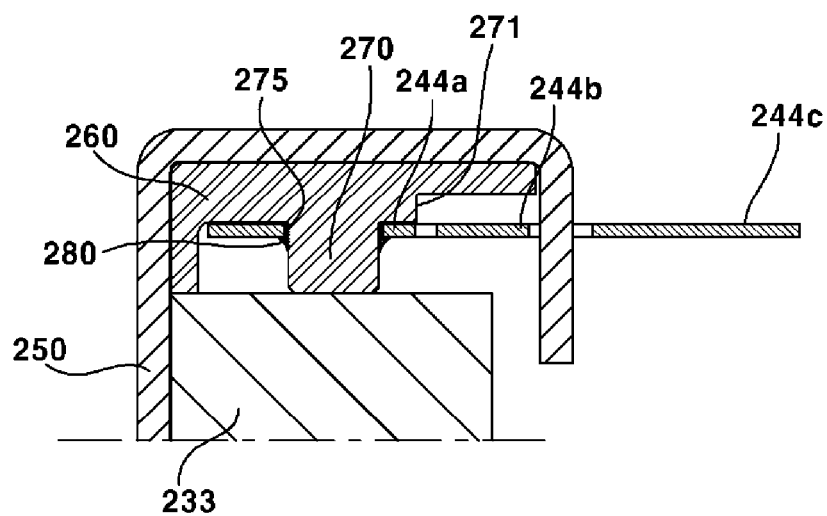
FIGS. 24, 25 and 26 are schematic view illustrating movement of upper elastic member of a camera module according to a third exemplary embodiment of the present disclosure.

Meanwhile, as illustrated in FIG. 24, the connection part (244b) may be a starting point of the staircase part (271), whereby the spacer member (260) and the connection part (244b) are prevented from interfering while the bobbin (240) vertically moves. Alternatively, the connection part (244b)

may be spaced apart from the starting point of the staircase part (271) at a predetermined distance.

Furthermore, the upper elastic member (244) may be spaced apart from an upper surface of an inner surface of the spacer member (260) coupled to the housing member (250) at a predetermined distance in order to prevent the spacer member (260) from interfering with the magnets (233) while the bobbin (240) vertically moves. The connection part (244b) of the upper elastic member may be positioned at a position spaced apart from the magnet to a horizontal direction. The connection part (244b) of the upper elastic member (244) may be positioned at a position spaced apart from the magnet to a vertical direction. Furthermore, the connection part (244b) of the upper elastic member may be positioned at a position spaced apart from the magnets to a diagonal direction, where the diagonal direction may include a diagonal direction relative to a horizontal direction, and a diagonal direction relative to a vertical direction.

Meantime, the first fixation part (244a) may be formed longer than the second fixation part (244c), and at least 22 pairs of connection parts (244b) may be diagonally arranged, each spaced apart to a lengthwise direction at a predetermined distance. At this time, the connection part (244b) may take a predetermined pattern, whereby the bobbin (240) can be supported. Furthermore, the connection part (244b) may also integrally connect the first and second fixation parts (244a, 244c).

That is, the connection part (244b) may be integrally connected at one end to the first fixation part (244a) and integrally connected at the other end to the second fixation part (244c). The connection part (244b) may be also so arranged as not to interfere with the spacer member (260) and the magnets (233). The connection part (244b) may perform an elasticity restoring function of the upper elastic member (244).

The upper elastic member (244) may be coupled at one end to a first protrusion (234a) formed at an upper surface of the bobbin (240), and connected at the other end with magnets and/or spacer. To this end, a position corresponding to that of the upper elastic member (244) may be formed with a first protrusion accommodation hole (244a).

Meanwhile, the upper elastic member (244) may be first coupled to an inner surface of the spacer member (260) in order to prevent the bobbin (240) from interfering with the housing member (250) when the bobbin (240) vertically moves. When the upper elastic member (244) is installed as mentioned in the foregoing, the upper elastic member (244) can be spaced apart from an upper surface of the housing member (250) at a predetermined distance to prevent the upper elastic member from interfering with the housing member (250). At this time, the distance may be formed longer than a stroke distance of the bobbin (240) to prevent the upper elastic member (244) from interfering with the housing member when the bobbin (240) performs an ascending operation. Furthermore, the connection part (244b) of the upper elastic member (244) may be positioned at a position spaced apart from the magnets to a horizontal direction. The connection part (244b) of the upper elastic member (244) may be positioned at a position spaced apart from the magnets to a vertical direction. Furthermore, the connection part (244b) of the upper elastic member may be positioned at a position spaced apart from the magnets to a diagonal direction, where the diagonal direction may include a diagonal direction relative to a horizontal direction, and a diagonal direction relative to a vertical direction. To this end, the spacer member (260) may be formed with a support protrusion (270), and a position corresponding to that of the upper elastic member (244) may be formed with a through hole (275), a detailed description of which will be provided later.

The bi-directional movement of the bobbin (240) may be elastically supported relative to an optical axis direction by the upper and bottom elastic members (244, 245) thus coupled. That is, the bobbin (240) may be controlled in upward and downward movements about an initial position spaced apart from the base (220) at a predetermined distance.

Meantime, the coil unit (243) may be provided as a ring-shaped coil block coupled to a periphery of the bobbin (240). The coil unit (243) formed in the shape of a coil block may include a straight line surface (243a) arranged at a position corresponding to that of the magnet (233) and a curved line surface (243b) arranged at a position corresponding to that of an inner yoke and an accommodation groove (described later).

Alternatively, the coil block-shaped coil unit (243) may take an angled shape, and may be of an octagonal shape. That is, the coil unit (243) may be formed with a straight line surface free from a curved line, where the shape of which is proposed in consideration of electromagnetic action with the oppositely-arranged magnet (233), and when a surface opposite to the magnet (233) is a plan, a surface of the facing coil unit (243) may be also a plan to thereby maximize the generation of electromagnetic force. However, the present disclosure is not limited thereto, and a surface of the coil unit (243) and a surface of the magnet (233) may be all curved or plain, or one of the surface of the coil unit (243) and the surface of the magnet (233) may be curved while the remaining surface may be plain.

Meantime, the bobbin (240) may include a first surface (240a) flatly formed on a surface corresponding to that of the straight line surface (243a) to allow the coil unit (243) to be coupled to a periphery of the bobbin (240), and a second surface (240b) formed in a round shape on a surface corresponding to that of the curved line surface (243b). Furthermore, the coil unit (243) may be directly wound on the bobbin (240), and in this case, the first surface (240a) may be formed with a protrusion part (247) configured to prevent the coil unit (243) from being deviated to an optical axis direction of the coil unit (243), whereby the coil unit (243) can be prevented from being deviated from an installation position by the shock generated during the reciprocal movement of the bobbin (240), or the arranged position of the coil unit (243) may be guided.

Furthermore, the bobbin (240) may be formed at a periphery with a plurality of accommodation grooves (not shown) forming a space part by being spaced apart from the coil unit (243) at a predetermined distance, where the plurality of accommodation grooves (not shown) may be inserted by an inner yoke (250a) formed on the housing member (250). The present disclosure is not limited thereto, and a separate yoke may be provided instead of the inner yoke (250a). At this time, the housing member (250) may be a yoke housing configured to function as a yoke.

The housing member (250) may be formed with a ferromagnetic body such as steel. Furthermore, the housing member (250) may be provided with an angled shape when viewed from an upper side in order to wrap the bobbin (240). At this time, the housing member (250) may take a square shape, as illustrated in FIG. 21, or an octagonal shape, albeit not being illustrated.

Furthermore, when the housing member (250) takes an octagonal shape when viewed from an upper side, and when a shape of the magnet (233) arranged at a corner of the housing member (250) takes a trapezoidal shape when viewed from an upper side, the magnetic field emitted from the corner of the housing member (250) can be minimized.

The housing member (250) may be integrally formed with an inner yoke (250*a*) at a position corresponding to that of the accommodation groove, and one surface of the inner yoke (250*a*) is spaced apart from the coil unit (243) at a predetermined distance, and the other surface of the inner yoke (250*a*) may be spaced apart from the bobbin (240) at a predetermined distance.

Furthermore, the inner yoke (250*a*) may be bent inward to a direction parallel with an optical axis from an upper surface of the housing member (250). The inner yoke (250*a*) may be symmetrically formed with a pair of escape grooves at a position near to the bent portion. The bent portion formed with the escape grooves may form a bottleneck section, and interference of the inner yoke (250*a*) and the bobbin (240) can be minimized during movement of the bobbin (240) by the section where the escape grooves are formed.

A distal end of the inner yoke (250*a*) needs to be spaced apart at a reference position at a predetermined distance from a floor surface of the accommodation groove, which is to prevent interference and contact between and with a distal end of the inner yoke and the floor surface of the accommodation grooves at a highest position during reciprocal movement of the bobbin (240). Furthermore, the distal end of the inner yoke (250*a*) may function as a stopper configured to restrain movement of the bobbin (240) to a section other than that of a designed specification.

The spacer member (260) may be coupled to an upper side at an inner space of the housing member (250) to secure the first fixation part (244*a*) of the upper elastic member (244) coupled to an upper side of the bobbin (240). The spacer member (260) may have a shape corresponding to that of an inner surface of the housing member (250), and may be formed therein with a space part. The size of the space part may be greater than a width and a thickness of the upper elastic member (244), such that even if the upper elastic member (244) is changed in shape by the movement of the bobbin (240), the inner surface of the spacer member (260) is prevented from interfering with the upper elastic member (244).

Figure 25:
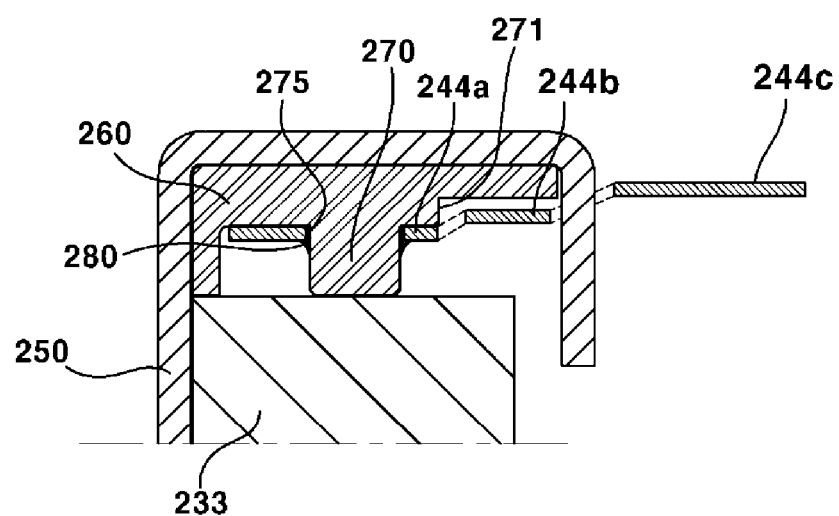
Figure 26:
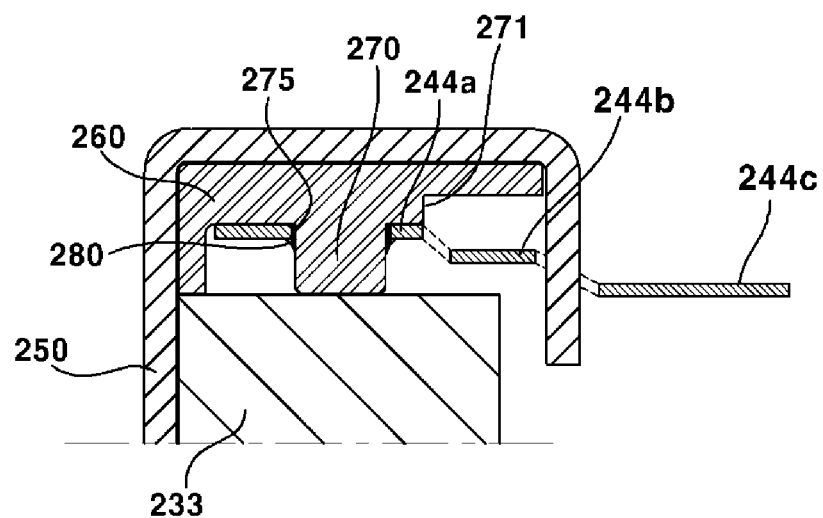

That is, as illustrated in FIGS. 24, 25 and 26, an inner surface of the spacer member (260) may be formed with a staircase part (271), whereby the upper elastic member (244) and an inner surface of the spacer member (260) are prevented from interfering when the upper elastic member (244) vertically moves. Furthermore, the staircase member (271) may be omitted to prevent the upper elastic member (244) and the housing member (250) from interfering.

Furthermore, a floor surface of a space part at an inner side of the spacer member (260) may be formed with a plurality of support protrusions (270) protrusively formed to a direction facing the housing member (250). The support protrusion (270) may be formed with an approximately cylindrically shaped boss. However, the present disclosure is not limited thereto, and may be formed in various shapes such as a triangular pillar, a square pillar and a polygonal shape. A length of the support protrusion (270) is preferably at least longer than a stroke distance of the bobbin (240), which is to prevent the upper elastic member (244) from interfering with ambient parts when the bobbin (240) vertically moves.

Meantime, the support protrusion (270) may be integrally formed with the spacer member (260) as one body. For example, when the spacer member (260) is formed with a metal material using press works, it is possible to form the spacer member (260) by protrusively changing the shape of a part of the support protrusion (270). Alternatively, when the spacer member (260) is injection molded using resin material, the support protrusion (270) may be shaped in a mold to thereby form the spacer member (260).

Furthermore, the spacer member (260) may be formed with an injection moldable material. However, the present disclosure is not limited thereto, and the spacer member (260) may be formed with a metal material. When the spacer member (260) may be formed with a metal material, the spacer member (260) is installed at an inner side of the housing member (250) functioning as a yoke to allow being configured with a ferromagnetic body as the housing member (250), whereby electromagnetic efficiency can be maximized. When the support protrusion (270) is integrally formed with the spacer member (260) to be installed at an inner side of the housing member (250), there is no need of installing a separate spacer at a bottom surface of the housing member (250) to enable reduction of height of the camera module.

The support protrusions (270) may be mounted at a position near to four corner areas at an upper side of the inner surface of the spacer member (260). However, the present disclosure is not limited thereto, and the support protrusions (270) may be formed at four surfaces. The support protrusion (270) is to fix an upper surface of the upper elastic member (244) and the magnets (233) by spacing apart at a predetermined distance, such that arranged position may be variably changed depending on design of the camera module. However, in view of the fact that corner areas are generally where there is a relatively sufficient space that is not interfered with other parts in the camera module, the support protrusions (270) may be preferably arranged at corners on a surface opposite to the housing member (250) of an inner surface of the spacer member (260).

Meanwhile, a through hole (275) having a shape corresponding to that of the support protrusion (270) may be piercingly formed at a position corresponding to that of the support protrusion (270) of the upper elastic member (244). The through hole (270) may be formed at a first fixation part (244*a*) side. Of course, a part of the through hole (275) may be overlappingly formed at a connection part (244*b*) side, but in view of the fact that the position of the connection part (244*b*) is a place where elastic transformation of the elastic members is generated, it is necessary that there be no interference with the pattern of the connection part (244*b*).

Although the through hole (275) and the support protrusion (270) may be press-fitted, a coupling part (280, see FIG. 23) may be formed at a coupled position using process using an adhesive, heat-seal or welding for maintenance of more stable coupling state.

As noted from the drawing, the coupling part (280) may be formed at a coupled area between the through hole (275) and the support protrusion (270), but the present disclosure is not limited thereto, and the coupling part (280) may be formed by directly bonding the upper elastic member (244) and an inner surface of the spacer member (260) using adhesion, heat-seal or welding. Furthermore, when the spacer member (260) is formed with steel material, the coupling part (280) may be coupled by welding with the upper elastic member (244).

Meantime, an end of the support protrusion (270) may surface-contact and/or line-contact and/or spot-contact an upper surface of the magnets (233) as illustrated in FIG. 24. At this time, the upper elastic member (244) is spaced apart from the magnets (233) at a predetermined distance while being coupled to the support protrusion (270), such that the upper elastic member (244) cannot be interfered with the magnets (233) and the spacer member (260) when the bobbin (240) vertically moves.

Furthermore, even if the support protrusion (270) is absent, the upper elastic member (244) can be interposed between the spacer member (260) and the magnet (233) to prevent interference with the housing member (250), whereby a stroke space can be obtained to a direction toward an upper surface of the housing member (250) as much as a thickness of the spacer member (250), and the connection part (244b) of the upper elastic member (244) starts from the magnet (233) to a magnet (233) direction or is spaced apart from the magnet (233) at a predetermined distance to obtain a stroke space whereby no interference can be generated.

The upper elastic member (244) may be initially assembled on an inner surface of the spacer member (260) at the time of assembly, and then assembly of other parts may be performed thereafter. For example, connection/fixation between the upper elastic member (244) and the bobbin (240) may be performed after the upper elastic member (244) is secured to the spacer member (260) side.

According to the abovementioned configuration, assembly process can be simplified over the conventional fixation process of upper elastic member (244) to thereby enhance the workability. Furthermore, the upper elastic member (244) can be prevented from being damaged during the assembly process, because supply of parts can be realized while the upper elastic member (244) and the spacer member (260) are supplied by being first assembled together.

FIGS. 24, 25 and 26 are schematic view illustrating movement of upper elastic member (244) of a camera module according to a third exemplary embodiment of the present disclosure, where the upper elastic member (244) is mounted at an upper side of the support protrusion (270).

At an initial position, the upper elastic member (244) is such that the first and second fixation parts (244a, 244c) and the connection part (244b) maintain a horizontal state as illustrated in FIG. 24, and when the bobbin (240) ascends as illustrated in FIG. 25, the first fixation part (244a) maintains a fixed position to allow the second fixation part (244c) connected to the bobbin (240) and the connection part (244b) to rise upwards of the support protrusion (270). In this case, there is generated no interference between the spacer member (260) and the upper elastic member (244).

Furthermore, as illustrated in FIG. 25, when the bobbin (240) descends to a direction of the image sensor (211, see FIG. 21), the first fixation part (244a) maintains a fixed position to allow the second fixation part (244c) connected to the bobbin (240) and the connection part (244b) to descend downwards of the support protrusion (270). In this case, the upper elastic member (244) descends downwards while maintaining a fixed state by coupling with the support protrusion (270), where, as the upper elastic member (244) and the magnets (233) are spaced apart at a predetermined distance as illustrated in FIG. 24, there is no interference between the magnets (233) and the upper elastic member (244) even during the descent of the bobbin (240). Thus, the bobbin (240) can smoothly perform the ascent and descent movement at a space part of an inner side of the housing member (250). A height of the support protrusion (270) may have at least a height more than a stroke distance of the bobbin (240) in order to have the movement of FIGS. 24 to 26.

The shape of the support protrusion (270) according to the above exemplary embodiments thus described may be selectively chosen as necessary within a scope where there is generated no interference with other parts when the shape and size of the upper elastic member (244) and an external look of the camera module are changed.

According to the third exemplary embodiment of the present disclosure, a support protrusion (270) can be inserted into an inner space part of the housing member (250) to provide a smooth vertical reciprocal movement to the bobbin (240) because the magnets (233), a holder member (not shown) and the upper elastic member (244) can be spaced apart at a predetermined distance using the support protrusion (270) integrally formed with the spacer member (260). Furthermore, there is no need of installing a separate spacer at an outside of the housing member (250) to thereby reduce the height of the camera module and to miniaturize the product.

Meanwhile, the camera module according to the third exemplary embodiment of the present disclosure is such that the upper elastic member (244) is first assembled to the spacer member (260) thus configured, and an assembly thereof is coupled to an inner surface of the housing member (250) and then, the magnets (233) can be assembled, whereby, when the assembly process is performed as per the above order, the upper elastic member (244) that may be easily damaged in the course of assembly process can be prevented from being damaged to thereby increase the assemblage, because the easily-damageable upper elastic member (244) is assembled on the housing member (250) while first being in an assembled state to the spacer member (260).

Furthermore, the staircase part (271) is formed at an ambience of the support protrusion (270) integrally formed with the spacer member (260) to allow the upper elastic member (244) to move inside a space formed by the stair case part (271), whereby when the upper elastic member (244) can be prevented from interfering with the housing member (250) when the bobbin (240) vertically and reciprocally moves. Thus, even if the upper elastic member (244) is installed at an inside of the housing member (250), a bi-directionally moveable actuator can be configured.

Hereinafter, a fourth exemplary embodiment of the present disclosure will be described in detail with reference to the accompanying drawings.

Figure 27:
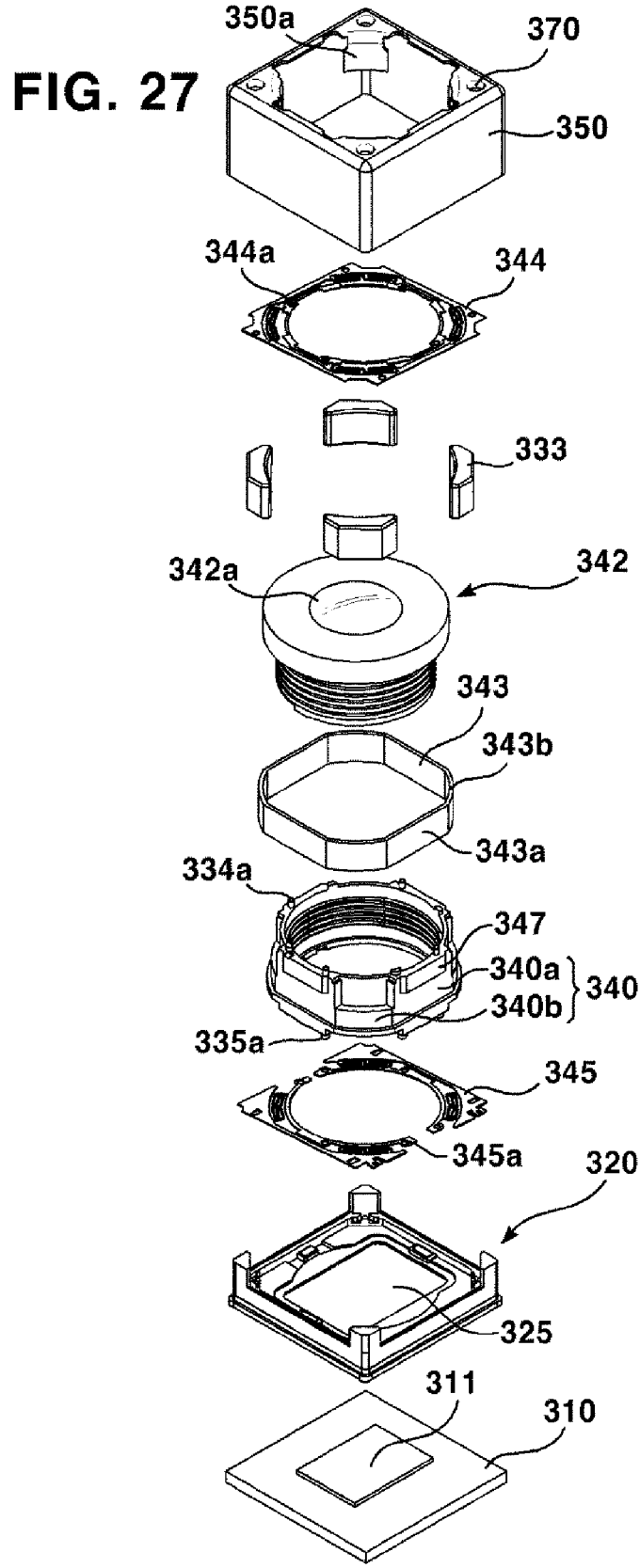
FIG. 27 is an exploded perspective view illustrating a camera module according to a fourth exemplary embodiment of the present disclosure.
Figure 28:
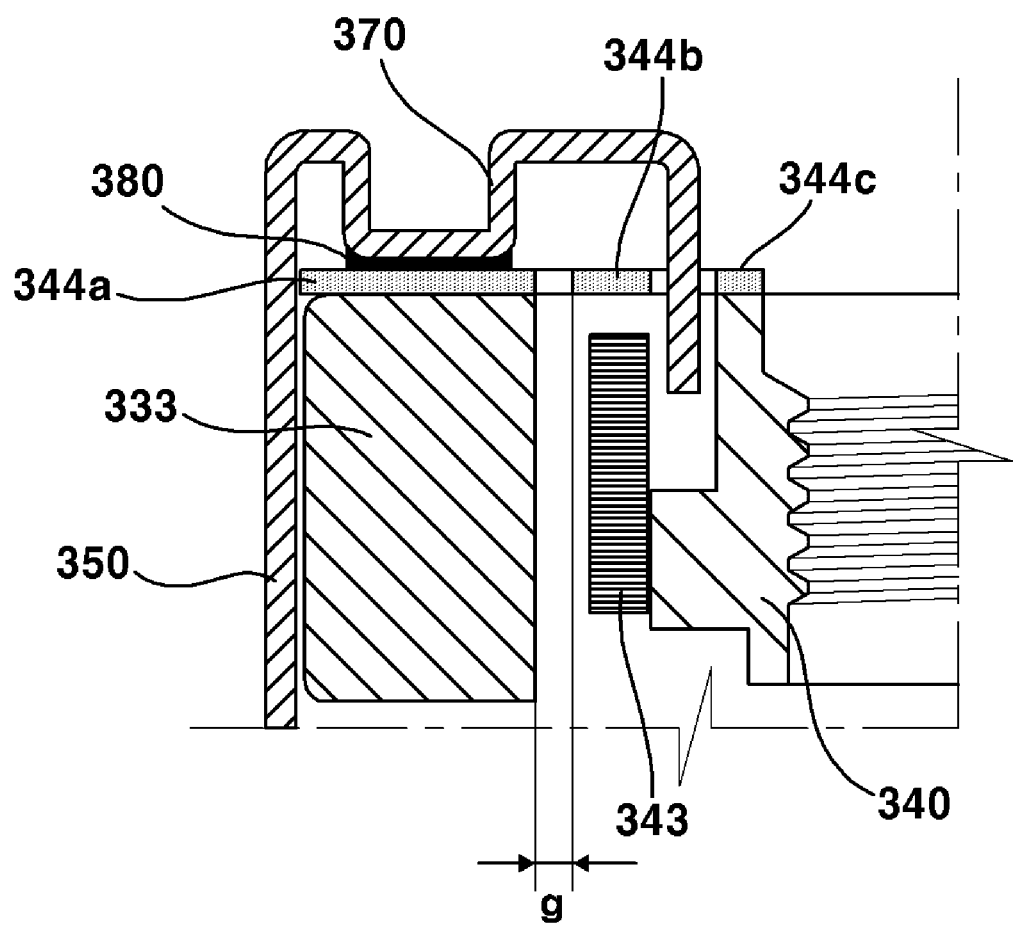
FIGS. 28, 29 and 30 are schematic view illustrating movement of upper elastic member mounted at an upper side of a housing member of a camera module according to a fourth exemplary embodiment of the present disclosure.
Figure 29:
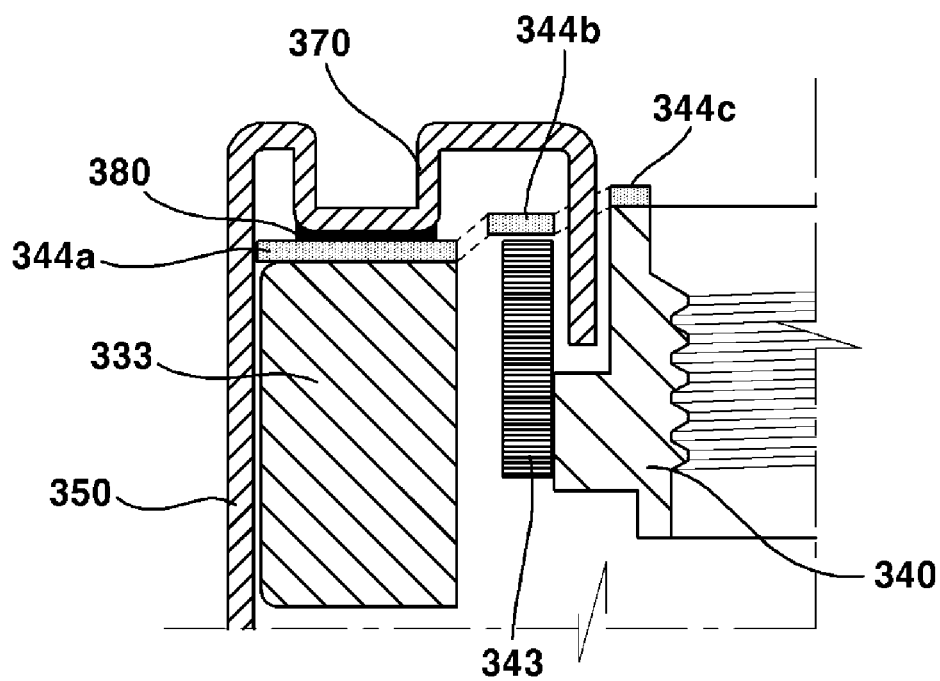
Figure 30:
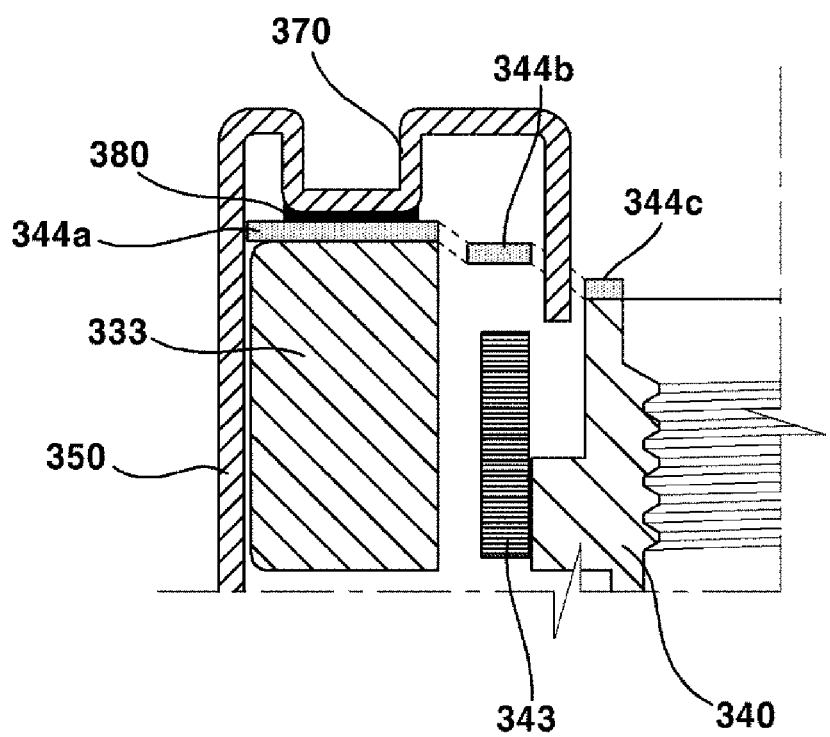

FIG. 27 is an exploded perspective view illustrating a camera module according to a fourth exemplary embodiment of the present disclosure, and FIGS. 28, 29 and 30 are schematic view illustrating movement of upper elastic member mounted at an upper side of a housing member of a camera module according to a fourth exemplary embodiment of the present disclosure.

Referring to FIG. 27, a camera module according to a fourth exemplary embodiment of the present disclosure may include a PCB (310), a base (320), a bobbin (340), and a housing member (350), and the housing member (350) may be integrally formed with a support protrusion (370).

The PCB (310) may be mounted with an image sensor (311) to form a floor surface of the camera module.

The base (320) may be mounted with an IR (Infrared) cut-off filter (325) at a position corresponding to that of the image sensor (311), may be coupled to the housing member (350), and may support a bottom side of the housing member (350). The base (320) may be mounted with a separate terminal member to electrically conduct with the PCB (310), and may be integrally formed with the terminal member using a surface electrode. Meanwhile, the base (320) may function as a sensor holder to protect the image sensor (311), and in this case, a protrusion part may be formed to a bottom side direction along a lateral surface of the base (320).

However, the protrusion part is not an essential part, and albeit not being illustrated in the drawings, a separate sensor holder may be arranged at a bottom surface of the base (320) to perform the role of the protrusion part.

Magnets (333) may be directly secured to the housing member (350, described later). When the magnets (333) are directly secured to the housing member (350), the magnets (333) may be directly bonded to a lateral surface or a corner area of the housing member (350). Furthermore, the magnets (333) may contact at an upper surface a first fixation part (344*a*) of an upper elastic member (344). When the housing member (350) is made of a metal material, the cut-off effect of magnetic field can be more prominent if the number of surfaces of the housing member (350) contacting the magnets (333) is great. Furthermore, at least more than two surfaces of the magnet (333) may contact the housing member (350).

For example, when the magnet (333) takes a trapezoidal shape when viewed from a plan, the magnet (333) may contact at least more than 28 inner lateral surfaces of the housing member (350). Although the fourth exemplary embodiment illustrates that the magnets (333) are arranged at four corner areas of the housing member (350), the magnets (333) may be arranged at four inner surfaces of the housing member (350).

A bottom elastic member (345) may be supported by the base (320) and/or by housing member (350), and an upper elastic member (344) may be supported by magnets (333) and/or by the housing member (350). At this time, the upper elastic member (344) may be interposed between the housing member (350) and the magnets (333), and the bottom elastic member (345) may be interposed between the housing member (350) and the base (320).

The bobbin (340) may be reciprocally mounted at an inside space of the housing member (350) to a direction parallel to an optical axis. The bobbin (340) may be mounted at a periphery with a coil unit (343) to enable an electrical interaction with the magnets (333). The bobbin (340) may include a lens barrel (342) mounted therein with at least one lens (342*a*). The lens barrel (342) may be so formed as to be screwed into the bobbin (340) as illustrated in FIG. 27. However, the present disclosure is not limited thereto, and the lens barrel (342) may be directly fixed to an inside of the bobbin (340) by other methods than the screwing method, or one sheet or more sheets of lenses (342*a*) may be integrally formed with bobbin (340) without the assistance of lens barrel (342). The lens (342*a*) may be formed with one sheet, or two or more lenses may be arranged to form an optical system.

The bobbin (340) may be mounted at an upper surface and a bottom surface with upper and bottom elastic members (344, 345). The upper elastic member (344) may be connected at one end to the bobbin (340) and may be arranged at the other end to a bottom side of the housing member (350, described later). The bottom elastic member (345) may be connected at one end to the bobbin (340) and connected at the other end to the base (320). To this end, the bobbin (340) may be formed at a bottom side with a protrusion (335*a*) for coupling with the bottom elastic member (345), and a protrusion accommodation hole (345*a*) may be formed at a position corresponding to that of the bottom elastic member (345), whereby the bottom elastic member (345) can be coupled.

Furthermore, the upper elastic member (344) may be coupled at one end to a first protrusion (334*a*) formed at an upper surface of the bobbin (340), and connected at the other end to the magnets (333) and/or housing member (350). To this end, a position corresponding to that of the upper elastic member (344) may be formed with a first protrusion accommodation hole (344*a*).

The upper elastic member (344) may include, as illustrated in FIG. 28, a first fixation part (344*a*) connected to the magnets (333) mounted at an inner side of the housing member (350) and/or a support protrusion (370, described later), a second fixation part (344*c*) connected to the bobbin (340), and a connection part (344*b*) configured to connect the first and second fixation parts (344*a*, 344*c*). At this time, the connection part (344*b*) may take a shape of a predetermined pattern, the movement of which supports the bobbin (340). Furthermore, the connection part (344*b*) may be so arranged as not to be interfered with a spacer (370, described later) and the housing member (350). The connection part (344*b*) performs an elasticity restoring function of the upper elastic member (344).

Meanwhile, as illustrated in FIG. 24, the connection part (344*b*) may be a starting point of a staircase part (371), whereby the spacer member (360) and the connection part (344*c*) are prevented from interfering while the bobbin (340) vertically moves. Alternatively, the connection part (344*b*) may be spaced apart from the starting point of the staircase part (371) at a predetermined distance.

Furthermore, the upper elastic member (344) may be spaced apart from an upper surface of an inner side of the housing member (350) at a predetermined distance in order to prevent from interfering with the housing member (350) while the bobbin (340) vertically moves. The connection part (344*b*) of the upper elastic member may be positioned at a position spaced apart from the magnet to a horizontal direction. The connection part (344*b*) of the upper elastic member (344) may be positioned at a position spaced apart from the magnet to a vertical direction. Furthermore, the connection part (344*b*) of the upper elastic member may be positioned at a position spaced apart from the magnets to a diagonal direction, where the diagonal direction may include a diagonal direction relative to a horizontal direction, and a diagonal direction relative to a vertical direction.

Furthermore, the upper elastic member (344) may include, as illustrated in FIG. 28, a first fixation part (344*a*) fixed to the housing member (350) side, a second fixation part (344*c*) connected to a bobbin (340) side, and a connection part (344*b*) configured to connect the first and second fixation parts (344*a*, 344*c*).

Meantime, the first fixation part (344*a*) may be formed longer than the second fixation part (344*c*), and at least 28 pairs of connection parts (344*b*) may be diagonally arranged, each spaced apart to a lengthwise direction at a predetermined distance. At this time, the connection part (344*b*) may take a predetermined pattern, whereby the bobbin (340) can be supported. Furthermore, the connection part (344*b*) may also integrally connect the first and second fixation parts (344*a*, 344*c*).

That is, the connection part (344*b*) may be integrally connected at one end to the first fixation part (344*a*) and integrally connected at the other end to the second fixation part (344*c*). The connection part (344*b*) may be also so arranged as not to interfere with the spacer (270, described later) and the housing member (350). The connection part (344*b*) may perform an elasticity restoring function of the upper elastic member (344).

Meanwhile, as illustrated in FIG. 28, the connection part (344*b*) may start from a starting point of the support protrusion (370), whereby the support protrusion (370) and an inner surface of the housing member (350) can be prevented from interfering with the connection part (344*b*) while the bobbin (340) vertically moves. Alternatively, the connection part (344b) may be spaced apart from the starting point of the support protrusion (370) at a predetermined distance.

Furthermore, the first fixation part (344a) may be fixed to the support protrusion (370) using a welding part (380). The present disclosure is not limited thereto, and the support protrusion (370) and the first fixation part (344a) may be pressed and fixed while in a surface-contacted state, or may be fixed using an adhesive member such as epoxy. Alternatively, the welding part (380) may be replaced with an adhesive member such as a double-sided tape, and may be replaced with an adhesive layer by coating with an adhesive agent such as epoxy. When there is a need of an electromagnetic characteristic being considered, the adhesive agent may be replaced with a conductive adhesive agent.

Meantime, the upper elastic member (344) may be spaced apart from an upper surface of the housing member (350) at a predetermined distance in order to prevent interference with the housing member (350) when the bobbin (340) vertically moves. To this end, the housing member (350) may be formed at an upper side of an inner surface with the integrally-formed support protrusion (370), the detailed configuration of which will be described later.

Meanwhile, as illustrated in FIG. 28, the magnet (333) and the connection part (344b) may be spaced apart at a predetermined distance (g), whereby contact and interference of the upper elastic member (344) and the magnet (333) can be avoided even during ascent and descent of the bobbin (340) to enable a smooth movement of the bobbin (340), as illustrated in FIGS. 28, 29 and 30. The distance (g) may be formed to a horizontal direction, a round direction, a vertical direction, as illustrated, or to a direction satisfying a combination thereof. That is, as illustrated in FIGS. 29 and 30, the connection part (344b) needs to be distanced at all times even if the bobbin (340) moves.

Meantime, a height of the support protrusion (370) may be formed longer than a rising stroke distance of the bobbin (340) to prevent the connection part (344b) of the upper elastic member (344) from interfering with an inner surface of the housing member (350) while the bobbin (340) performs the ascending operation.

The bi-directional movement of the bobbin (340) may be elastically supported relative to an optical axis direction by the upper and bottom elastic members (344, 345) thus coupled. That is, the bobbin (340) may be controlled in upward and downward movements about an initial position spaced apart from the base (320) at a predetermined distance.

Meantime, the coil unit (343) may be provided as a ring-shaped coil block insertedly coupled to a periphery of the bobbin (340). The coil unit (343) formed in the shape of a coil block may include a straight line surface (343a) arranged at a position corresponding to that of the magnet (333) and a curved line surface (343b) arranged at a position corresponding to that of an inner yoke and an accommodation groove (described later).

Alternatively, the coil block-shaped coil unit (343) may take an angled shape, or may be of an octagonal shape. That is, the coil unit (343) may be formed with a straight line surface free from a curved line, where the shape of which is proposed in consideration of electromagnetic action with the oppositely-arranged magnet (333), and when a surface opposite to the magnet (333) is a plan, a surface of the facing coil unit (343) may be also a plan to thereby maximize the generation of electromagnetic force. However, the present disclosure is not limited thereto, and a surface of the coil unit (343) and a surface of the magnet (333) may be all curved or plain, or one of the surface of the coil unit (343) and the surface of the magnet (333) may be curved while the remaining surface may be plain.

Meantime, the bobbin (340) may include a first surface (340a) flatly formed on a surface corresponding to that of the straight line surface (343a) to allow the coil unit (343) to be coupled to a periphery of the bobbin (340), and a second surface (340b) formed in a round shape on a surface corresponding to that of the curved line surface (343b). Furthermore, the coil unit (343) may be directly wound on the bobbin (340), and in this case, the first surface (340a) may be formed with a protrusion part (347) configured to prevent the coil unit (343) from being deviated to an optical axis direction of the coil unit (343), whereby the coil unit (343) can be prevented from being deviated from an installation position by the shock generated during the reciprocal movement of the bobbin (340), or the arranged position of the coil unit (343) may be guided.

Furthermore, the bobbin (340) may be formed at a periphery with a plurality of accommodation grooves (not shown) forming a space part by being spaced apart from the coil unit (343) at a predetermined distance, where the plurality of accommodation grooves (not shown) may be inserted by an inner yoke (350a) formed on the housing member (350). However, the present disclosure is not limited thereto, and a separate yoke may be provided instead of the inner yoke (350a). At this time, the housing member (350) may be a yoke housing configured to function as a yoke.

The housing member (350) may be formed with a ferromagnetic body such as steel. Furthermore, the housing member (350) may be provided with an angled shape when viewed from an upper side in order to wrap the bobbin (340). At this time, the housing member (350) may take a square shape, as illustrated in FIG. 27, or an octagonal shape, albeit not being illustrated.

Furthermore, when the housing member (350) takes an octagonal shape when viewed from an upper side, and when a shape of the magnet (333) arranged at a corner of the housing member (350) takes a trapezoidal shape when viewed from an upper side, the magnetic field emitted from the corner of the housing member (350) can be minimized.

The housing member (350) may be integrally formed with an inner yoke (350a) at a position corresponding to that of the accommodation groove, and one surface of the inner yoke (350a) is spaced apart from the coil unit (343) at a predetermined distance, and the other surface of the inner yoke (350a) may be spaced apart from the bobbin (340) at a predetermined distance. Furthermore, the inner yoke (350a) and the accommodation grooves (not shown) may be formed at four corner areas of the housing member (350). The inner yoke (350a) may be bent inwardly to a direction parallel with an optical axis from an upper surface of the housing member (350). The inner yoke (350a) may be symmetrically formed with a pair of escape grooves at a position near to the bent portion. The bent portion formed with the escape grooves may form a bottleneck section, and interference of the inner yoke (350a) and the bobbin (340) can be minimized during movement of the bobbin (340) by the section where the escape grooves are formed.

A distal end of the inner yoke (350a) needs to be spaced apart from a reference position at a predetermined distance from a floor surface of the accommodation groove, which is to prevent interference and contact between and with a distal end of the inner yoke and the floor surface of the accommodation grooves at a highest position during reciprocal movement of the bobbin (340). Furthermore, the distal end of the inner yoke (350a) may function as a stopper configured to restrain movement of the bobbin (340) to a section other than that of a designed specification.

As illustrated in FIG. 28, the support protrusion (370) may be protrusively and inwardly formed at an upper surface of the housing member (350), where the term of inwardly indicates a bottom direction of the housing member (350) coupled by the PCB (310). That is, as illustrated in the drawing, the upper elastic member (344) is arranged at an inside of the housing member (350), such that the support protrusion (370) is protruded to a direction facing an upper surface of the upper elastic member (344) to allow an end of the support protrusion (370) to be brought into contact with the upper surface of the upper elastic member (344).

Meantime, an end of the support protrusion (370) may be flatly provided, and may be partially curved. The end of the support protrusion (370) and the upper surface of the upper elastic member (344) may be brought into contact, and surface-contacted and/or line-contacted and/or spot-contacted. A position thus contacted may further include a welding part (380) or a coupling part. In this case, the coupling force between the first fixation part (344a) and the support protrusion (370) may be further maintained.

Furthermore, as illustrated in FIGS. 28 and 29, an upper surface of the housing member (350) may be integrally and protrusively formed with support protrusions (370). The support protrusions (370) may be mounted at a position near to four corner areas of the housing member (350). However, the present disclosure is not limited thereto, and the support protrusions (370) may be formed at four surfaces. The support protrusions (370) are to distance the upper elastic member (344) from the housing member (350) at a predetermined space, such that the arranged position may be variably changed depending on design of the camera module. This is to prevent the interference between the bobbin and the housing member when the bobbin moves downwards.

For example, the support protrusions (370) may be formed at angled surface instead of corner areas. However, in view of the fact that corner areas are generally where there is a relatively sufficient space that is not interfered with other parts in the camera module, the support protrusions (370) is preferably arranged at corner areas.

The support protrusion (370) is preferably formed along with the housing member (350) when the housing member (350) is formed. For example, when the housing member (350) is formed, it is possible to form the support protrusion (370) by pressing a position to be formed with the support protrusions (370) in a protrusively changed shape. The housing member (350) may function as a yoke by forming with a metal material, and when the support protrusions (370) are formed by press works, an external portion at an upper surface formed with the support protrusion (370) of the housing member (350) may include a concaved recess portion as illustrated in FIGS. 30 and 6.

When the housing member (350) is injection molded, it is possible to form a shape of support protrusion (370) in a mold. When the support protrusion (370) is integrally formed with the housing member (350) instead of separate component, the number of parts can be reduced because of no need of using a separate spacer. Furthermore, the assembly process can be simplified because of omission of assembly process for spacer.

FIGS. 28, 29 and 30 are schematic view illustrating movement of upper elastic member (344) mounted at an upper side of a housing member of a camera module according to a fourth exemplary embodiment of the present disclosure, where an end of the support protrusion (370) tightly contacts an upper surface of the upper elastic member (344).

At an initial position, the upper elastic member (344) is such that the first fixation part (344a) coupled to the housing member, the second fixation part (344c) connected to the bobbin (340) and the connection part (344b) maintain a horizontal state as illustrated in FIG. 28, and when the bobbin (340) ascends as illustrated in FIG. 29, the first fixation part (344a) maintains a fixed position to allow the second fixation part (344c) connected to the bobbin (340) and the connection part (344b) to rise upwards of the support protrusion (370). In this case, there is generated no interference between the housing member (350) and the upper elastic member (344) because the first fixation part (344a) is fixed in position by coupling with the support protrusion (370) and only the connection part (344b) moves upwards.

Furthermore, as illustrated in FIG. 30, when the bobbin (340) descends to a direction of the image sensor (311, see FIG. 27), the first fixation part (344a) maintains a fixed position to allow the second fixation part (344c) connected to the bobbin (340) and the connection part (344c) to descend downwards of the support protrusion (370).

In this case, the connection part (344c) and the second fixation part (344c) move to a space formed by the support protrusion (370) to prevent generation of interference between the housing member (350) and the upper elastic member (344). Thus, the bobbin (240) can smoothly perform the ascent and descent movement even without a separate configuration of spacer. Furthermore, the support protrusion (370) may have at least a height more than a stroke distance of the bobbin (340) in order to have the movement of FIGS. 30 and 6.

Meantime, FIGS. 7 to 11 are drawings to exemplify various modifications of a camera module according to the first exemplary embodiment of the present disclosure. At this time, the explanation of a camera module according to the fourth exemplary embodiment of the present disclosure may be inferred and applied from the various modifications of camera module according to the first exemplary embodiment of the present disclosure.

According to the fourth exemplary embodiment of the present disclosure, the shape of an upper surface of the housing member (350) may be changed without a separate spacer part to form the integrally-formed support protrusion (370) in a space part inside the housing member (350), whereby an assembly process for spacer assembly can be omitted to simplify the overall assembly process. Furthermore, the effect of reducing the manufacturing cost due to reduced number of parts can be accomplished, and problems such as erroneous operation caused by inevitable inflow of foreign objects into a connected gap between parts can be solved.

Still furthermore, the upper elastic member (344) can be installed at an inner space part through changed shape of an upper surface of the housing member (350) to advantageously accomplish the product miniaturization because of the reduced height of the camera module.

Hereinafter, a fifth exemplary embodiment of the present disclosure will be described in detail with reference to the accompanying drawings.

Figure 31:
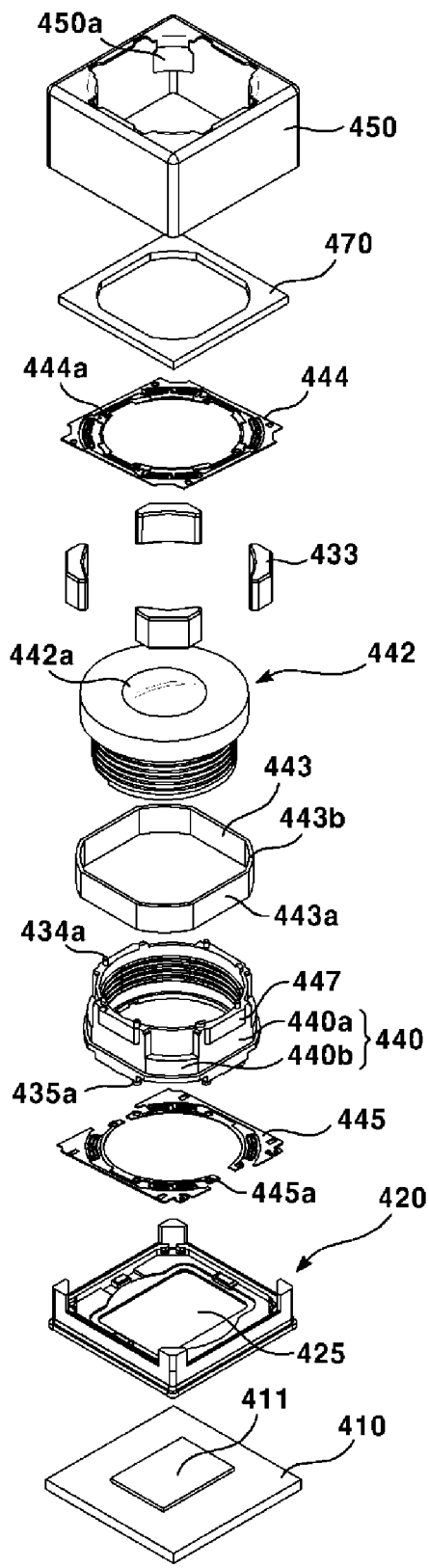
FIG. 31 is an exploded perspective view illustrating a camera module according to a fifth exemplary embodiment of the present disclosure.
Figure 32:
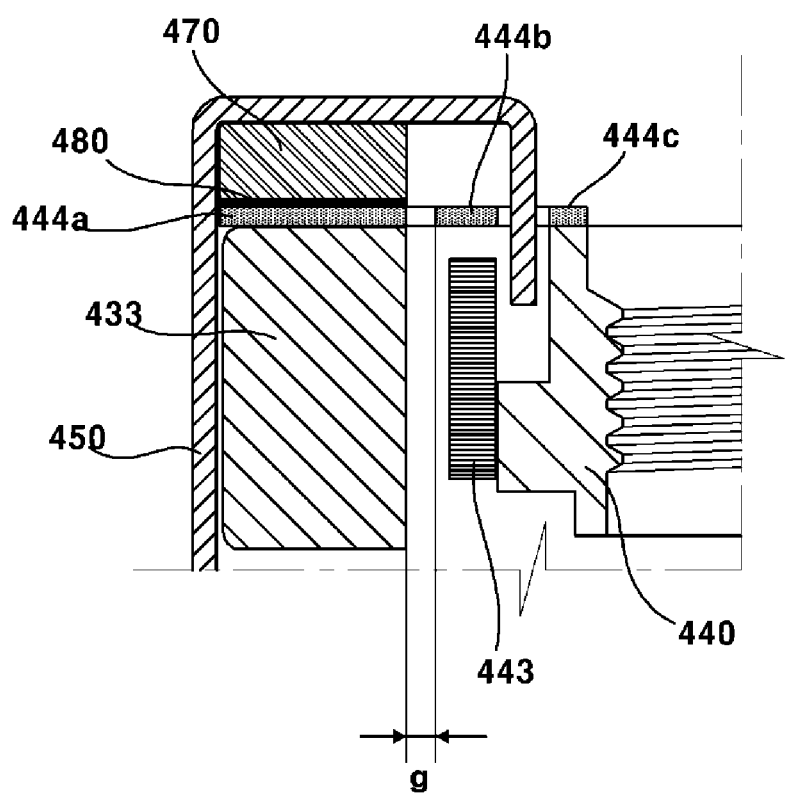
FIGS. 32, 33 and 34 are schematic view illustrating movement of upper elastic member during movement of bobbin of a camera module according to a fifth exemplary embodiment of the present disclosure.
Figure 33:
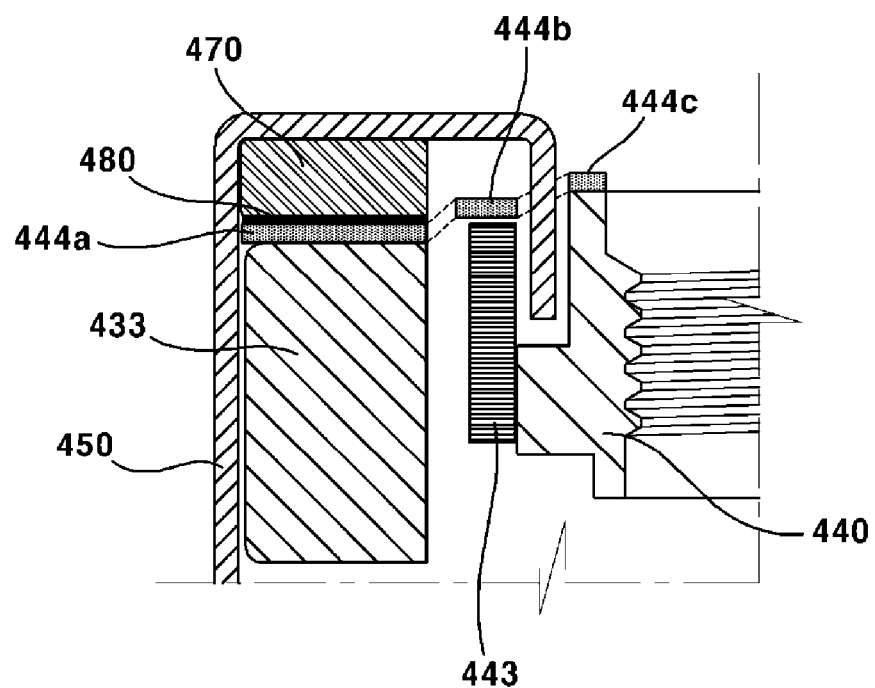
Figure 34:
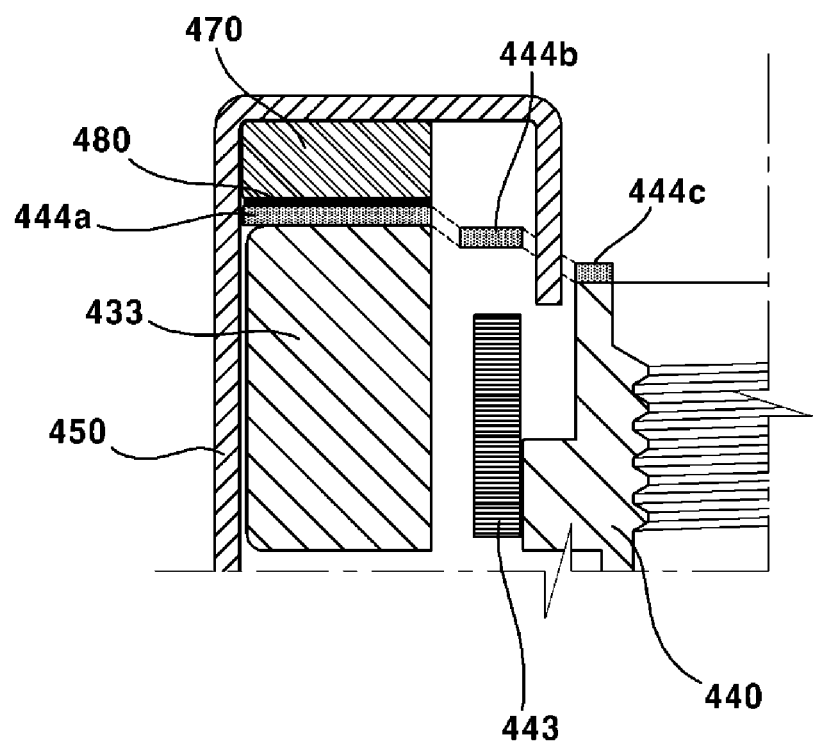

FIG. 31 is an exploded perspective view illustrating a camera module according to a fifth exemplary embodiment of the present disclosure, and FIGS. 32, 33 and 34 are schematic view illustrating movement of upper elastic member during movement of bobbin of a camera module according to a fifth exemplary embodiment of the present disclosure.

Referring to FIG. 31, a camera module according to the fifth exemplary embodiment of the present disclosure may include a PCB (410), a base (420), a bobbin (440), and a housing member (450), and the housing member (450) may be installed therein with a spacer (470).

The PCB (410) may be mounted with an image sensor (411) to form a floor surface of the camera module.

The base (420) may be mounted with an IR (Infrared) cut-off filter (425) at a position corresponding to that of the image sensor (411), may be coupled to the housing member (450), and may support a bottom side of the housing member (450). The base (420) may be mounted with a separate terminal member to electrically conduct with the PCB (410), and may be integrally formed with the terminal member using a surface electrode. Meanwhile, the base (420) may function as a sensor holder to protect the image sensor (411), and in this case, a protrusion part may be formed to a bottom side direction along a lateral surface of the base (420). However, the protrusion part is not an essential part, and albeit not being illustrated in the drawings, a separate sensor holder may be arranged at a bottom surface of the base (420) to perform the role of the protrusion part.

Magnets (433) may be directly secured to the housing member (450, described later). When the magnets (433) are directly secured to the housing member (450), the magnets (433) may be directly bonded to a lateral surface or a corner area of the housing member (450). Furthermore, the magnets (433) may contact at an upper surface a first fixation part (444a) of an upper elastic member (444, described later). When the housing member (450) is made of a metal material, the cut-off effect of magnetic field can be more prominent if the number of surfaces of the housing member (450) contacting the magnets (433) is great. Furthermore, at least more than two surfaces of the magnet (433) may contact the housing member (450).

For example, when the magnet (433) takes a trapezoidal shape when viewed from a plan, the magnet (433) may contact at least more than 33 inner lateral surfaces of the housing member (450). Although the fifth exemplary embodiment illustrates that the magnets (433) are arranged at four corner areas of the housing member (450), the magnets (433) may be arranged at four inner surfaces of the housing member (450).

A bottom elastic member (445) may be supported by the base (420) and/or by housing member (450), and an upper elastic member (444) may be supported by magnets (433) and/or by the spacer (470). At this time, the upper elastic member (444) may be interposed between the spacer (470) and the magnets (433), and the bottom elastic member (445) may be interposed between the housing member (450) and the base (420).

The bobbin (440) may be reciprocally mounted at an inner space of the housing member (450) to a direction parallel to an optical axis. The bobbin (440) may be mounted at a periphery with a coil unit (443) to enable an electrical interaction with the magnets (433). The bobbin (440) may include a lens barrel (442) mounted therein with at least one lens (442a). The lens barrel (442) may be so formed as to be screwed into the bobbin (440) as illustrated in FIG. 31. However, the present disclosure is not limited thereto, and the lens barrel (442) may be directly fixed to an inside of the bobbin (440) by other methods than the screwing method, or one sheet or more sheets of lenses (442a) may be integrally formed with bobbin (440) without the assistance of lens barrel (442). The lens (442a) may be formed with one sheet, or two or more lenses may be arranged to form an optical system.

The bobbin (440) may be mounted at an upper surface and a bottom surface with upper and bottom elastic members (444, 445). The upper elastic member (444) may be connected at one end to the bobbin (440) and may be arranged at the other end to a bottom side of the housing member (450, described later). The bottom elastic member (445) may be connected at one end to the bobbin (440) and connected at the other end to the base (420). To this end, the bobbin (440) may be formed at a bottom side with a protrusion (435a) for coupling with the bottom elastic member (445), and a protrusion accommodation hole (445a) may be formed at a position corresponding to that of the bottom elastic member (445).

Furthermore, the upper elastic member (444) may be coupled at one end to a first protrusion (434a) formed at an upper surface of the bobbin (440), and connected at the other end to the magnets (433) and/or the spacer. To this end, a position corresponding to that of the upper elastic member (444) may be formed with a first protrusion accommodation hole (444a).

The upper elastic member (444) may include, as illustrated in FIG. 32, a first fixation part (444a) connected to the magnets (433) mounted at an inner side of the housing member (450) and/or the spacer (470, described later), a second fixation part (444c) connected to the bobbin (440), and a connection part (444b) configured to connect the first and second fixation parts (444a, 444c).

The first fixation part (444a) may be formed longer than the second fixation part (444c), and at least 32 pairs of connection parts (444b) may be diagonally and lengthwise formed each connection part being spaced apart at a predetermined distance.

At this time, the connection part (444b) may take a shape of a predetermined pattern, the movement of which supports the bobbin (440). Furthermore, the connection part (444b) may integrally connect first and second fixation parts (444a, 444c). That is, the connection part (444b) may be integrally connected at one end to the first fixation part (444a) and connected at the other end to the second fixation part (444c).

The connection part (444b) may be also so arranged as not to interfere with the spacer (470, described later) and the housing member (450). The connection part (444b) may perform an elasticity restoring function of the upper elastic member (444).

Meanwhile, as illustrated in FIG. 32, the connection part (444b) may start from a starting point of the spacer (470), whereby the spacer (470) and the connection part (444b) can be prevented from interfering while the bobbin (440) vertically moves. Alternatively, the connection part (444b) may be spaced apart from the starting point of the spacer (470) at a predetermined distance.

Furthermore, the upper elastic member (444) may be spaced apart from an upper surface of an inner side of the housing member (450) at a predetermined distance in order to prevent from interfering with the housing member (450) while the bobbin (440) vertically moves. The connection part (444b) of the upper elastic member may be positioned at a position spaced apart from the magnet (433) to a horizontal direction. The connection part (444b) of the upper elastic member (444) may be positioned at a position spaced apart from the magnets to a vertical direction. Furthermore, the connection part (444b) of the upper elastic member may be positioned at a position spaced apart from the magnets (433) to a diagonal direction, where the diagonal direction may include a diagonal direction relative to a horizontal direction, and a diagonal direction relative to a vertical direction.

To this end, the spacer (470) having a predetermined height is mounted at an inner surface of the housing member (450), and the first fixation part (444a) of the upper elastic member (444) may be interposed between the spacer (470) and the magnets (433).

The spacer (470) may be first assembled and coupled to the housing member (450), and then to the upper elastic member (444). The spacer (470) may be formed with a ferromagnetic body such as steel to maximize the efficiency of the electromagnetic force. Furthermore, the spacer (470) may be formed with a metal material of a plate shape with a very thin thickness. That is, the spacer (470) functions to press and support the first fixation part (444a) and to distance an inner surface of the housing member (450) at a predetermined space, such that no separate staircase part is required. Thus, the spacer (470) may have a predetermined thickness.

Furthermore, a part of the spacer (470) may include an escape section not to interfere with the connection part (444b) of the upper elastic member (444). That is, the spacer (470) may include an escape structure at a place near the connection part (444b) in order to be horizontally distanced from the connection part (444b) at a predetermined space.

Furthermore, as illustrated in FIGS. 32, 33 and 34, the spacer (470) may be tightly fixed by the first fixation part (444a) and a welding part (480). When the spacer (470) and the upper elastic member (444) are assembled, the upper elastic member (444) can be minimized in deformation thereof. However, the present disclosure is not limited thereto, and the welding part (480) may be omitted. That is, an upper surface of the spacer (470) may be tightly bonded to an inner surface of the housing member (450), a floor surface opposite thereto may tightly bond the first fixation part (444a) of the upper elastic member (444) and a floor surface of the first fixation part (444a) may be tightly bonded to an upper surface of the magnet (433). Furthermore, it may be also possible to fix by grasping the upper elastic member (444) using pressure formed through the coupling between the housing member (450) and the base (420).

Alternatively, the welding part (480) may be replaced with an adhesive member such as a double-sided tape, and may be replaced with an adhesive layer by coating with an adhesive agent such as epoxy. When there is a need of an electromagnetic characteristic being considered, the adhesive agent may be replaced with a conductive adhesive agent.

Meanwhile, as illustrated in FIG. 32, the magnet (433) and the connection part (444b) may be spaced apart at a predetermined distance (g), whereby contact and interference of the upper elastic member (444) and the magnet (433) can be avoided even during ascent and descent of the bobbin (440) to enable a smooth movement of the bobbin (440), as illustrated in FIGS. 32, 33 and 34. The distance (g) may be formed to a horizontal direction, a round direction, a vertical direction, as illustrated, or to a direction satisfying a combination thereof. That is, as illustrated in FIGS. 33 and 34, the connection part (444b) needs to be distanced from the magnets (433) at all times even if the bobbin (440) moves.

Meantime, a height of the spacer (470) may be formed longer than a rising stroke distance of the bobbin (440) to prevent the connection part (444b) of the upper elastic member (444) from interfering with an inner surface of the housing member (450) while the bobbin (440) performs the ascending operation.

The bi-directional movement of the bobbin (440) may be elastically supported relative to an optical axis direction by the upper and bottom elastic members (444, 445) thus coupled. That is, the bobbin (440) may be controlled in upward and downward movements about an initial position spaced apart from the base (420) at a predetermined distance.

Meantime, a coil unit (443) may be provided as a ring-shaped coil block insertedly coupled to a periphery of the bobbin (440). The coil unit (443) formed in the shape of a coil block may include a straight line surface (443a) arranged at a position corresponding to that of the magnet (433) and a curved line surface (443b) arranged at a position corresponding to that of an inner yoke and an accommodation groove (described later).

Alternatively, the coil block-shaped coil unit (443) may take an angled shape, or may be of an octagonal shape. That is, the coil unit (443) may be formed with a straight line surface free from a curved line, where the shape of which is proposed in consideration of electromagnetic action with the oppositely-arranged magnet (433), and when a surface opposite to the magnet (433) is a plan, a surface of the facing coil unit (443) may be also a plan to thereby maximize the generation of electromagnetic force. However, the present disclosure is not limited thereto, and a surface of the coil unit (443) and a surface of the magnet (433) may be all curved or plain, or one of the surface of the coil unit (443) and the surface of the magnet (433) may be curved while the remaining surface may be plain.

Meantime, the bobbin (440) may include a first surface (440a) flatly formed on a surface corresponding to that of the straight line surface (443a) to allow the coil unit (443) to be coupled to a periphery of the bobbin (440), and a second surface (440b) formed in a round shape on a surface corresponding to that of the curved line surface (443b). Furthermore, the coil unit (443) may be directly wound on the bobbin (440), and in this case, the first surface (440a) may be formed with a protrusion part (447) configured to prevent the coil unit (443) from being deviated to an optical axis direction of the coil unit (443), whereby the coil unit (443) can be prevented from being deviated from an installation position by the shock generated during the reciprocal movement of the bobbin (440), or the arranged position of the coil unit (443) may be guided.

Furthermore, the bobbin (440) may be formed at a periphery with a plurality of accommodation grooves (not shown) forming a space part by being spaced apart from the coil unit (443) at a predetermined distance, where the plurality of accommodation grooves (not shown) may be inserted by an inner yoke (450a) formed on the housing member (450). However, the present disclosure is not limited thereto, and a separate yoke may be provided instead of the inner yoke (450a). At this time, the housing member (450) may be a yoke housing configured to function as a yoke.

The housing member (450) may be formed with a ferromagnetic body such as steel. Furthermore, the housing member (450) may be provided with an angled shape when viewed from an upper side in order to wrap the bobbin (440). At this time, the housing member (450) may take a square shape, as illustrated in FIG. 31, or an octagonal shape, albeit not being illustrated.

Furthermore, when the housing member (450) takes an octagonal shape when viewed from an upper side, and when a shape of the magnet (433) arranged at a corner of the housing member (450) takes a trapezoidal shape when viewed from an upper side, the magnetic field emitted from the corner of the housing member (450) can be minimized.

The housing member (450) may be integrally formed with the inner yoke (450a) at a position corresponding to that of the accommodation groove, and one surface of the inner yoke (450a) is spaced apart from the coil unit (443) at a predetermined distance, and the other surface of the inner yoke (450a) may be spaced apart from the bobbin (440) at a predetermined distance. Furthermore, the inner yoke (450a) and the accommodation grooves (not shown) may be formed at four corner areas of the housing member (450). The inner yoke (450a) may be bent inwardly to a direction parallel with an optical axis from an upper surface of the housing member (450). The inner yoke (450a) may be symmetrically formed with a pair of escape grooves at a position near to the bent portion. The bent portion formed with the escape grooves may form a bottleneck section, and interference of the inner yoke (450a) and the bobbin (440) can be minimized during movement of the bobbin (440) by the section where the escape grooves are formed.

A distal end of the inner yoke (450a) needs to be spaced apart from a reference position at a predetermined distance from a floor surface of the accommodation groove, which is to prevent interference and contact between and with a distal end of the inner yoke and the floor surface of the accommodation grooves at a highest position during reciprocal movement of the bobbin (440). Furthermore, the distal end of the inner yoke (450a) may function as a stopper configured to restrain movement of the bobbin (440) to a section other than that of a designed specification.

FIGS. 32, 33 and 34 are schematic view illustrating movement of upper elastic member (444) during movement of bobbin of a camera module according to a fifth exemplary embodiment of the present disclosure.

At an initial position, the upper elastic member (444) is such that the first and second fixation parts (444a, 444c) and the connection part (444b) maintain a horizontal state as illustrated in FIG. 32, and when the bobbin (440) ascends as illustrated in FIG. 33, the first fixation part (444a) maintains a fixed position to allow the second fixation part (444c) connected to the bobbin (440) and the connection part (444b) to rise upwards of the spacer (470). In this case, interference can be prevented because an upper surface at an inner side of the housing member (450) and the upper elastic member (444) are distanced by the spacer (470).

Furthermore, as illustrated in FIG. 34, when the bobbin (440) descends to a direction of the image sensor (411, see FIG. 31), the first fixation part (444a) maintains a fixed position to allow the second fixation part (444c) connected to the bobbin (440) and the connection part (444c) to descend downwards of the spacer (470).

At this time, the first fixation part (444a) of the upper elastic member (444) descends downwards by the coupling with the spacer (470) in a fixed state, and because the connection part (444c) of the upper elastic member (444) and the magnets (433) are spaced apart at a predetermined distance (g) from each other as illustrated in FIG. 32, there is generated no interference between the magnets (433) and the upper elastic member (444) even the bobbin (430) descends.

According to the fifth exemplary embodiment of the present disclosure, the spacer (470) can be installed at an inner side of the housing member (450) to advantageously to reduce the height of the camera module. That is, the spacer (470) can be installed at an inner space of the housing member (450) to dispense with assembly of a separate top housing member at an exposed upper side of the housing member (450) to enable a miniaturization of the camera module.

Still furthermore, the spacer (470) is made of steel material to maximize the efficiency of electromagnetic interaction between the coil unit (443) wound on the bobbin and the magnets (433) for performing the auto focusing function of the camera module.

Still furthermore, because the spacer (470) is first installed at an inner side of the housing member (450), and then the magnets (433) are assembled after the spacer (470) and the upper elastic member (444) are secured, the number of damaged parts during the assembly process can be reduced by minimizing the damage to the upper elastic member (444) at the time of assembly.

Although the above exemplary embodiments of the present disclosure have explained and illustrated all the constituent parts that are coupled into one body to operate, the present disclosure is not always limited thereto. That is, one or more the constituent parts may be selectively coupled to operate as long as the combination is within the scope of the present disclosure.

The terminology used herein is for the purpose of describing particular embodiments only and is not intended to be limiting of the disclosure. As used herein, it will be understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The previous description of the present disclosure is provided to enable any person skilled in the art to make or use the inventive disclosure. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The present disclosure has been made to solve the foregoing problems of the prior art and therefore an object of certain embodiments of the present disclosure is to provide a camera module improved in structure configured to reduce the number of parts by using a bi-directionally driven actuator.

The present disclosure is to solve at least one or more of the above problems and/or disadvantages in whole or in part and to provide at least advantages described hereinafter. In order to achieve at least the above objects, in whole or in part, and in accordance with the purposes of the present disclosure, as embodied and broadly described, and in one general aspect of the present disclosure, there is provided a camera module, the camera module comprising: a PCB (Printed Circuit Board) mounted with an image sensor; a housing member arranged at an upper surface of the PCB; a bobbin movably positioned at an inner side of the housing member; an upper elastic member connected to an upper surface of the housing member and to an upper surface of the bobbin, and a space forming part formed at one side of the housing member to provide a moving space to the upper elastic member when the bobbin makes a relatively vertical movement to the housing member.

In another general aspect of the present disclosure, there is provided a camera module, the camera module comprising: a PCB (Printed Circuit Board) mounted with an image sensor; a bobbin arranged at an upper side of the PCB, upper and bottom surfaces of which being respectively connected to each side of upper and bottom elastic members; a housing member arranged at an upper surface of the PCB and mounted at an inner space with the bobbin; and a spacer member mounted at an inner surface of the housing member to provide a moving space to the upper elastic member when the housing and the upper elastic member are coupled to allow the bobbin to vertically move relative to the housing member.

A camera module according to a first exemplary embodiment of the present disclosure may include a PCB (Printed Circuit Board) mounted with an image sensor; a bobbin arranged at an upper surface of the PCB, upper and bottom sides of which being respectively connected to each side of upper and bottom elastic members; a housing member arranged at an upper side of the PCB to support a reciprocal movement of the bobbin by being supported at one side of the upper elastic member to an upper surface; and a support protrusion integrally formed at an upper surface of the housing member to support a floor surface of the upper elastic member.

Preferably, but not necessarily, the support protrusion may be protrusively formed at four corner areas of the housing member.

Preferably, but not necessarily, the support protrusion may have a height greater than a vertical movement stroke of the bobbin.

Preferably, but not necessarily, the support protrusion may take any one shape of a round, a square and a triangle.

Preferably, but not necessarily, the support protrusion may be spaced apart at a predetermined distance from a corner area connected to a lateral wall of the housing member, or may be tightly contacted to a corner area connected to a lateral wall of the housing member.

Preferably, but not necessarily, the upper elastic member may include a first fixation part fixed to a housing member side, a second fixation part fixed to a bobbin side, and a connection part configured to connect the first and second fixation parts.

Preferably, but not necessarily, the first fixation part may be supported at a floor surface by the support protrusion.

Preferably, but not necessarily, the first fixation part may be formed with a groove portion at a position corresponding to that of the support protrusion.

Preferably, but not necessarily, the support protrusion and the groove portion may be fixedly coupled by any one of adhesion, heat-seal and welding methods.

The camera module according to an exemplary embodiment of the present disclosure may further comprise a base arranged at an upper side of the PCB, and a holder member coupled to the base, mounted with a plurality of magnets and coupled by the other end of the bottom elastic member.

Preferably, but not necessarily, the holder member may be formed at four sides with magnet installation holes inserted by magnets, each magnet of same size.

Preferably, but not necessarily, the holder member may be fixed at a floor surface to the base, and coupled at an upper surface to the housing member.

Preferably, but not necessarily, the bobbin may be formed at an inner surface with a lens barrel mounted with at least one lens.

Preferably, but not necessarily, the housing member may be formed with a ferromagnetic body, and may form an external look of the camera module by being coupled to the base.

Preferably, but not necessarily, the camera module may further comprise a ring-shaped coil block coupled to the bobbin by being inserted to a periphery of the bobbin.

A camera module according to a first exemplary embodiment of the present disclosure may further comprise a cover member configured to support an upper side of the upper elastic member.

Preferably, but not necessarily, the cover member may be protrusively formed at an inner surface opposite to the upper elastic member with a plurality of support bosses.

Preferably, but not necessarily, the support bosses may be coaxially arranged with the support protrusion.

The camera module according to a second exemplary embodiment of the present disclosure may include a PCB (Printed Circuit Board) mounted with an image sensor; a bobbin arranged at an upper surface of the PCB, upper and bottom sides of which being respectively connected to each side of upper and bottom elastic members; a housing member arranged at an upper side of the PCB and mounted with the bobbin at an inner space part; and a cover member arranged at an upper side of the housing member and fixed at an inner surface by the upper elastic member to allow being spaced apart from an upper surface of the housing member at a predetermined distance.

Preferably, but not necessarily, the cover member may include a support protrusion coupled by the upper elastic member at an inner surface opposite to the housing member, and a staircase part formed near the support protrusion.

Preferably, but not necessarily, the upper elastic member may further include a first through hole having a shape corresponding to that of the support protrusion.

Preferably, but not necessarily, a first coupling part formed by any one of adhesion, heat-seal and welding methods may be formed at a coupling position between the support protrusion and the first through hole.

Preferably, but not necessarily, the upper elastic member may include a first fixation part formed with the first through hole fixed to a cover member side, a second fixation part fixed to a bobbin side, and a connection part configured to connect the first and second fixation parts.

Preferably, but not necessarily, the housing member may further include a second through hole having a shape corresponding to that of the support protrusion.

Preferably, but not necessarily, the support protrusion may be coupled to a first through hole formed at a position corresponding to that of the upper elastic member and a second through hole formed at a position corresponding to that of the housing member.

Preferably, but not necessarily, a second coupling part formed by any one of adhesion, heat-seal and welding methods may be formed at a coupling position between the support protrusion and the second through hole.

Preferably, but not necessarily, each of the first and second through holes and support protrusion may take a round shape at a cross-section to a direction perpendicular to a coupling direction.

Preferably, but not necessarily, a distance between the upper elastic member and the housing member may be formed to be longer than a distance between rising stroke and falling stroke of bobbin.

Preferably, but not necessarily, the support protrusions may be protrusively formed at four corner areas at an upper side of an inner surface of the cover member.

Preferably, but not necessarily, a shape of a plain surface on the support protrusion may take any one shape of a round, a square and a triangle.

Preferably, but not necessarily, the support protrusion may be spaced apart at a predetermined distance from a corner area connected to a lateral wall of the cover member.

The camera module according to an exemplary embodiment of the present disclosure may further comprise a base arranged at an upper side of a PCB, and a holder member coupled to the base, mounted with a plurality of magnets and coupled by the other end of the bottom elastic member.

Preferably, but not necessarily, the holder member may be formed at four sides thereof with magnet installation holes inserted by magnets, each magnet of same size.

Preferably, but not necessarily, the holder member may be fixed at a floor surface to the base, and coupled at an upper surface to the housing member.

Preferably, but not necessarily, the bobbin may be formed at an inner surface with a lens barrel mounted with at least one lens.

Preferably, but not necessarily, the housing member may be formed with a ferromagnetic body, and may form an external look of the camera module by being coupled to the base.

Preferably, but not necessarily, the camera module may further comprise a ring-shaped coil block coupled to the bobbin by being inserted to a periphery of the bobbin.

A camera module according to a third exemplary embodiment of the present disclosure may include a PCB (Printed Circuit Board) mounted with an image sensor; a bobbin arranged at an upper surface of the PCB, upper and bottom surfaces of which being respectively connected to each side of upper and bottom elastic members; a housing member arranged at an upper surface of the PCB and mounted at an inner space with the bobbin; and a spacer member mounted at an inner surface of the housing member, fixed at an inner surface by the upper elastic member and formed near a fixed position of the upper elastic member with a staircase part to form a space part configured to allow the upper elastic member to move therein.

Preferably, but not necessarily, the spacer member may be any one of injection moldable resin material and metal material.

Preferably, but not necessarily, the spacer member may be coupled to the housing member after the upper elastic member is assembled.

Preferably, but not necessarily, the spacer member may be formed at an inner surface opposite to the housing member with a support protrusion coupled by the upper elastic member.

Preferably, but not necessarily, the upper elastic member may further include a through hole having a shape corresponding to that of the support protrusion.

Preferably, but not necessarily, a coupling part formed by any one of adhesion and welding methods may be formed at a coupling position between the support protrusion and the through hole.

Preferably, but not necessarily, each of the support protrusion and the through hole may take a round shape at a cross-section to a direction perpendicular to a coupling direction.

Preferably, but not necessarily, the upper elastic member may include a first fixation part formed with a through hole fixed to a spacer member side, a second fixation part fixed to a bobbin side, and a connection part configured to connect the first and second fixation parts.

Preferably, but not necessarily, the support protrusion may be formed to be longer than a distance between rising stroke and falling stroke of bobbin.

Preferably, but not necessarily, the support protrusions may be protrusively formed at four corner areas at an upper side of an inner surface of the spacer member.

Preferably, but not necessarily, a shape of a plain surface on the support protrusion may take any one shape of a round, a square and a triangle.

Preferably, but not necessarily, the support protrusion may be spaced apart at a predetermined distance from a corner area connected to a lateral wall of the spacer member.

The camera module according to an exemplary embodiment of the present disclosure may comprise a base arranged at an upper side of a PCB.

Preferably, but not necessarily, the bobbin may be formed at an inner surface with a lens barrel mounted with at least one lens.

Preferably, but not necessarily, the housing member may be formed with a ferromagnetic body, and may form an external look of the camera module by being coupled to the base.

Preferably, but not necessarily, the camera module may further comprise a ring-shaped coil block coupled to the bobbin by being inserted to a periphery of the bobbin.

A camera module according to a fourth exemplary embodiment of the present disclosure may include: a PCB (Printed Circuit Board) mounted with an image sensor; a bobbin arranged at an upper side of the PCB, upper and bottom surfaces of which being respectively connected to each side of upper and bottom elastic members; a housing member arranged at an upper side of the PCB to install the upper and bottom elastic members and bobbin in an inner space thereof; and a support protrusion integrally formed with an inner surface opposite to the upper elastic member at an upper surface of the housing member to support an upper side of the upper elastic member.

Preferably, but not necessarily, the support protrusion may be protrusively formed at four corner areas of the housing member.

Preferably, but not necessarily, the support protrusion has a height greater than a vertical movement stroke of the bobbin.

Preferably, but not necessarily, a shape of a plain surface on the support protrusion may take any one shape of a round, a square and a triangle.

Preferably, but not necessarily, the support protrusion may be spaced apart at a predetermined distance from a corner area connected to a lateral wall of the cover member, or tightly contact a corner area connected to a lateral wall of the housing member.

Preferably, but not necessarily, the upper elastic member may include a first fixation part fixed to the support protrusion, a second fixation part fixed to a bobbin side, and a connection part configured to connect the first and second fixation parts.

A camera module according to a fourth exemplary embodiment of the present disclosure may further include a welding part formed at a position mutually contacted by the support protrusion and the first fixation part.

A camera module according to a fourth exemplary embodiment of the present disclosure may further include a base arranged at an upper side of the PCB, and a holder member coupled to the base, mounted with a plurality of magnets and coupled by the other end of the bottom elastic member.

Preferably, but not necessarily, the holder member may be mounted at four corner areas with magnets.

Preferably, but not necessarily, the holder member may be coupled at a floor surface to the base, and at an upper surface to the housing member.

Preferably, but not necessarily, the bobbin may be formed at an inner surface with a lens barrel mounted with at least one lens.

Preferably, but not necessarily, the housing member may be formed with a ferromagnetic body, and may form an external look of the camera module by being coupled to the base.

Preferably, but not necessarily, the camera module may further comprise a ring-shaped coil block coupled to the bobbin by being inserted to a periphery of the bobbin.

A camera module according to a fourth exemplary embodiment of the present disclosure may include: a PCB (Printed Circuit Board) mounted with an image sensor; a bobbin arranged at an upper side of the PCB, upper and bottom surfaces of which being respectively connected to each side of upper and bottom elastic members; a housing member arranged at an upper side of the PCB to install the bobbin in an inner space thereof; and a spacer of metal material arranged at an inner surface of the housing member, surface-contacted at an upper surface by the housing member, and surface-contacted at a bottom surface by an upper surface of the upper elastic member.

Preferably, but not necessarily, the spacer may be formed with a steel material.

Preferably, but not necessarily, the spacer may be welded to an upper surface of the upper elastic member after first being coupled to the housing member.

Preferably, but not necessarily, the spacer may take a shape from one of a board shape and a plate shape.

Preferably, but not necessarily, the upper elastic member may include a first fixation part fixed to a housing member side, a second fixation part fixed to a bobbin side, and a connection part configured to connect the first and second fixation parts, and the spacer may be welded to an upper surface of the first fixation part.

Preferably, but not necessarily, the connection part may be so arranged as not to interfere with the spacer and the housing member.

Preferably, but not necessarily, the thickness of the spacer may be thicker than a distance between a rising stroke and a falling stroke of the bobbin.

A camera module according to a fifth exemplary embodiment of the present disclosure may further include a base arranged at an upper side of the PCB, and a holder member coupled to the base, mounted with a plurality of magnets and coupled by the other end of the bottom elastic member.

Preferably, but not necessarily, the upper elastic member may be formed on any one upper surface of a bottom surface of a spacer, a holder member and a magnet.

Preferably, but not necessarily, the holder member may be coupled at a floor surface to the base, and at an upper surface to the housing member.

Preferably, but not necessarily, the bobbin may be formed at an inner surface with a lens barrel mounted with at least one lens.

Preferably, but not necessarily, the housing member may be formed with a ferromagnetic body, and may form an external look of the camera module by being coupled to the base.

Preferably, but not necessarily, the camera module may further comprise a ring-shaped coil block coupled to the bobbin by being inserted to a periphery of the bobbin.

The camera module according to the exemplary embodiments of the present disclosure has an advantageous effect in that a plurality of support protrusions configured to support an upper elastic member is integrally formed at an upper side of a housing member to obtain a stroke space configured to bi-directionally move a bi-directionally driven actuator to dispense with a separate spacer between the housing member and the upper elastic member, whereby the number of parts can be reduced to subsequently reduce the number of assembly processes and manufacturing cost.

Another advantageous effect is that a spacer can be mounted at an inner space part of a housing member through a camera module according to an exemplary embodiment of the present disclosure to reduce a height of the camera module and to accomplish the miniaturization of a product. Furthermore, assemblage can be improved because magnets are mounted by coupling a housing member after first coupling an upper elastic member to a support protrusion integrally formed with a spacer, and other parts are assembled thereafter. Still furthermore, the spacer is formed longer than a stroke distance of a bobbin, whereby interference with other parts can be prevented even during the vertical movement of the bobbin.

Still another advantageous effect is that the upper elastic member can be mounted being spaced apart from an inner upper surface of the housing member at a predetermined distance by magnets mounted at an inner surface of the spacer and the housing member and the spacer to prevent the upper elastic member from interfering with the housing member through the camera module according to an exemplary embodiment of the present disclosure. Furthermore, the spacer is formed with a steel to maximize an efficiency of electromagnetic interaction between coil block wound on a bobbin and the magnet for performance of focusing function of the camera module.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A VCM (Voice Coil Motor) comprising:
   a housing member comprising an upper plate and a lateral plate extending from the upper plate;
   a bobbin disposed in the housing member;

a coil disposed on the bobbin;

a magnet disposed between the coil and the lateral plate of the housing member; and an upper elastic member comprising a first fixing part disposed between the upper plate of the housing member and the magnet, a second fixing part coupled with the bobbin, and a connection part connecting the first fixing part and the second fixing part, wherein the magnet is disposed on the lateral plate of the housing member, wherein the first fixing part of the upper elastic member is fixed to the upper plate of the housing member by an adhesive member, and wherein the connection part of the upper elastic member is spaced apart from the upper plate of the housing member.

2. The VCM of claim 1, wherein the upper plate of the housing member comprises a support protrusion protruding toward the magnet, wherein the first fixing part of the upper elastic member is fixed to the support protrusion by the adhesive member.

3. The VCM of claim 1, wherein the magnet the magnet is directly bonded to the housing member.

4. The VCM of claim 1, wherein a lower surface of the first fixing part contacts with an upper surface of the magnet, and wherein the connection part of the upper elastic member is spaced apart from the magnet.

5. The VCM of claim 2, wherein the upper plate of the housing member comprises a flat plate and the support protrusion integrally formed with the flat plate, wherein a lower surface of the support protrusion is disposed at a position lower than that of a lower surface of the flat plate, wherein the first fixing part of the upper elastic member is fixed to the lower surface of the support protrusion by the adhesive member, and wherein an area of an upper surface of the magnet is greater than an area of the lower surface of the support protrusion.

6. The VCM of claim 1, wherein the lateral plate of the housing member extends from an outer edge of the upper plate of the housing member, wherein the housing member comprises an inner yoke extending from an inner edge of the upper plate, wherein the coil is disposed on an outer lateral surface of the bobbin, wherein the bobbin comprises a groove formed on the outer lateral surface of the bobbin, and wherein a portion of the inner yoke is disposed in the groove of the bobbin and between the coil and the bobbin.

7. The VCM of claim 6, wherein the connection part of the upper elastic member is disposed between the first fixing part of the upper elastic member and the inner yoke.

8. The VCM of claim 1, wherein the connection part of the upper elastic member is overlapped with the coil in an optical axis direction.

9. The VCM of claim 1, comprising:

a base disposed below the bobbin and coupled with the lateral plate of the housing member; and a lower elastic member comprising a third fixing part disposed on an upper surface of the base, a fourth fixing part coupled with the bobbin, and another connection part connecting the third fixing part and the fourth fixing part, and wherein the lower elastic member comprises two elastic units spaced apart from each other.

10. The VCM of claim 2, wherein the lateral plate of the housing member comprises four lateral plates, wherein four corner regions are formed by the four lateral plates, wherein the magnet comprises four magnets, and wherein the four magnets are disposed on the four corner regions of the housing member, respectively.

11. The VCM of claim 10, wherein the support protrusion is formed on each of the four corner regions of the housing member.

12. The VCM of claim 1, wherein the coil has an octagonal shape.

13. The VCM of claim 1, wherein the adhesive member comprises an epoxy.

14. The VCM of claim 5, wherein the support protrusion of the housing member is bent from the flat plate of the housing member.

15. A camera module, comprising:

a PCB (Printed Circuit Board);

an image sensor disposed on the PCB;

the VCM of claim 1 disposed on the PCB; and a lens coupled with the bobbin of the VCM.

16. A VCM (Voice Coil Motor) comprising:

a housing member comprising an upper plate and a lateral plate extending from the upper plate;

a bobbin disposed in the housing member;

a coil disposed on the bobbin;

a magnet disposed between the coil and the lateral plate of the housing member; and an upper elastic member comprising a first fixing part disposed between the upper plate of the housing member and the magnet, a second fixing part coupled with the bobbin, and a connection part connecting the first fixing part and the second fixing part, wherein the magnet is disposed on the lateral plate of the housing member, wherein the upper plate of the housing member comprises a flat plate and a support protrusion integrally formed with the flat plate, wherein a lower surface of the support protrusion is disposed at a position lower than that of a lower surface of the flat plate, and wherein the first fixing part of the upper elastic member is fixed between the lower surface of the support protrusion and the magnet.

17. The VCM of claim 16, wherein an adhesive member connects the lower surface of the support protrusion and the first fixing part.

18. The VCM of claim 16, wherein the connection part of the upper elastic member is spaced apart from the upper plate of the housing member and the magnet.

19. The VCM of claim 16, wherein a lower surface of the first fixing part contacts with an upper surface of the magnet.

20. A VCM (Voice Coil Motor) comprising:

a housing member comprising an upper plate and a lateral plate extending from the upper plate;

a bobbin disposed in the housing member;

a coil disposed on the bobbin;

a magnet disposed between the coil and the lateral plate of the housing member; and an upper elastic member comprising a first fixing part disposed between the upper plate of the housing member and the magnet, a second fixing part coupled with the bobbin, and a connection part connecting the first fixing part and the second fixing part, wherein the upper plate of the housing member comprises a protruding part protruding toward the magnet,
wherein the magnet is contacted with the first fixing part of the upper elastic member,
wherein the magnet is bonded to the housing member by an adhesive member,
wherein the first fixing part of the upper elastic member is fixed to the protruding part of the housing member.

\* \* \* \* \*